(12) United States Patent
Kuroda et al.

(10) Patent No.: US 7,370,405 B2
(45) Date of Patent: May 13, 2008

(54) FABRICATION METHOD OF A HIGH GRADIENT-FIELD RECORDING HEAD FOR PERPENDICULAR MAGNETIC RECORDING

(75) Inventors: Atsuko Kuroda, Hachioji (JP);
Masafumi Mochizuki, Kokubunji (JP)

(73) Assignee: Hitachi Global Storage Technologies Japan, Ltd., Kanagawa (JP)

( * ) Notice: Subject to any disclaimer, the term of this patent is extended or adjusted under 35 U.S.C. 154(b) by 270 days.

(21) Appl. No.: 11/079,134

(22) Filed: Mar. 15, 2005

(65) Prior Publication Data

US 2005/0157424 A1    Jul. 21, 2005

Related U.S. Application Data

(63) Continuation of application No. 10/862,582, filed on Jun. 8, 2004, now abandoned, which is a continuation of application No. 10/076,432, filed on Feb. 19, 2002, now Pat. No. 6,775,099.

(30) Foreign Application Priority Data

Jul. 24, 2001    (JP)    ............... 2001-222407

(51) Int. Cl.
*G11B 5/127*    (2006.01)
*H04R 31/00*    (2006.01)
(52) U.S. Cl. .............. 29/603.16; 29/603.13; 29/603.14; 29/603.15; 29/603.18; 360/126; 360/317; 451/5; 451/41; 216/62; 216/66; 216/67
(58) Field of Classification Search .......... 29/603.11, 29/603.13–603.16, 603.18, 605, 606; 360/126, 360/317; 451/5, 41
See application file for complete search history.

(56) References Cited

U.S. PATENT DOCUMENTS

| 5,995,341 A | 11/1999 | Tanaka et al. |
| 6,285,528 B1 | 9/2001 | Akiyama et al. |
| 6,560,069 B1 | 5/2003 | Litvinov et al. |
| 6,791,793 B1 | 9/2004 | Chen et al. |

FOREIGN PATENT DOCUMENTS

| JP | 2-10509 | 1/1990 |
| JP | 4-17105 | 1/1992 |
| JP | 2001-101611 | 4/2001 |
| JP | 2001-101612 | 4/2001 |
| JP | 2002-197614 | 7/2002 |

OTHER PUBLICATIONS

23rd Japan Applied Magnetics Society's Scientific Lecture 5aB-6, 1996, p. 31.

*Primary Examiner*—Paul D. Kim
(74) *Attorney, Agent, or Firm*—Mattingly, Stanger, Malur & Brundidge, PC

(57) ABSTRACT

A thin film magnetic head for perpendicular recording of a single-pole type has a flux enhanced part and a flux enhanced end arranged on a leading side of the main pole in parallel with the cross track direction. The side surface of the main pole intersecting the cross track direction is arranged on the track center side perpendicular to the track width. The field gradient of a perpendicular magnetic field on the trailing side of the main pole and near both ends of the track is made steep to realize a higher areal recording density. The head is fabricated by forming a first resist pattern on an inorganic insulating layer. A slope is formed on the inorganic insulating layer with the resist pattern as a mask. A second resist pattern is then formed on the inorganic insulating layer to form a magnetic layer on the inorganic insulating layer.

2 Claims, 24 Drawing Sheets

(1) CONVENTIONAL STRUCTURE (2) STRUCTURE ACCORDING TO THIS INVENTION

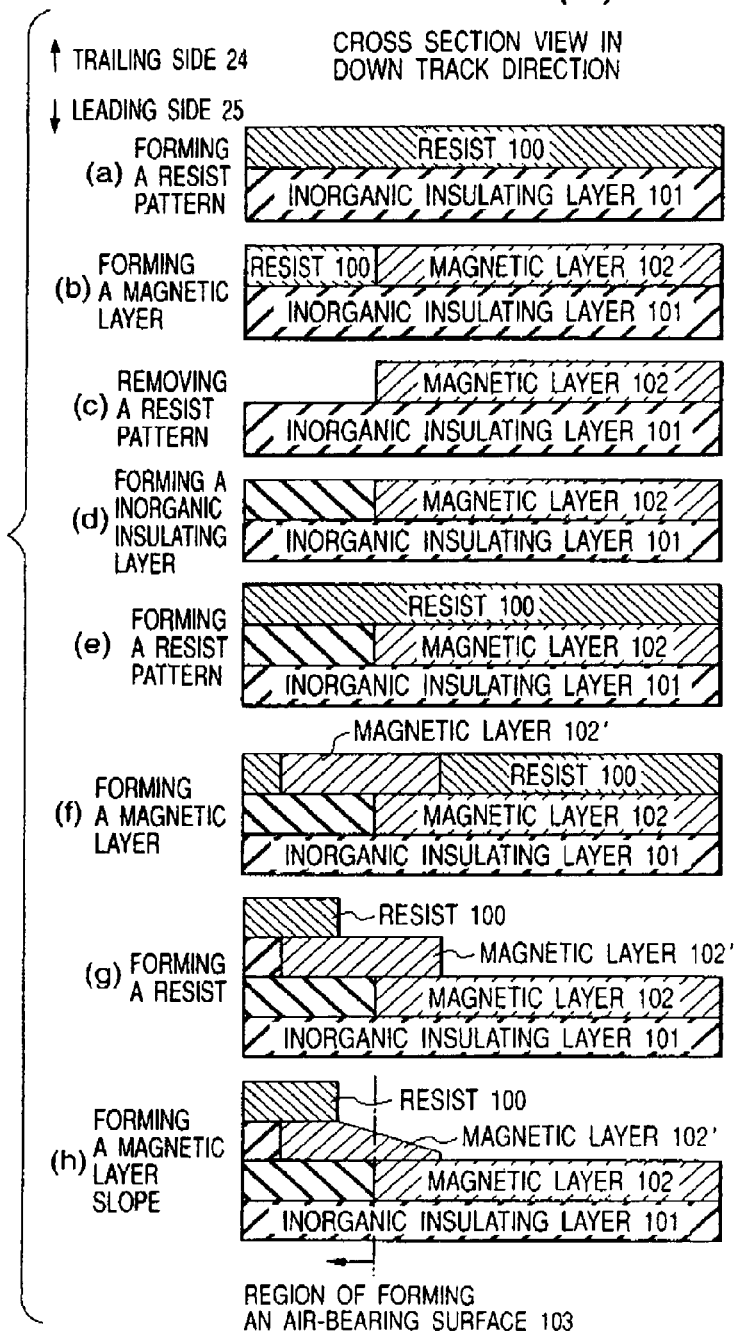
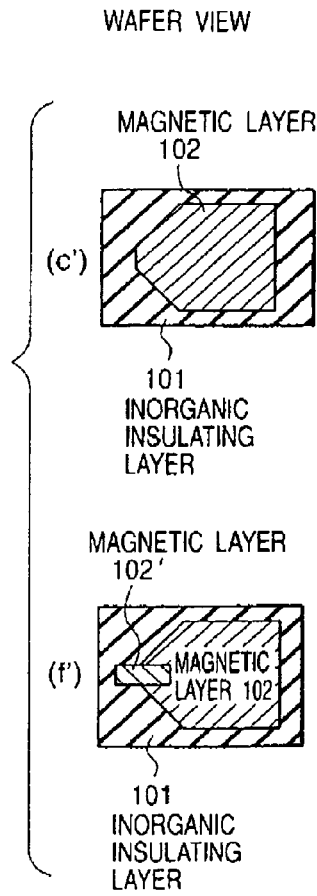

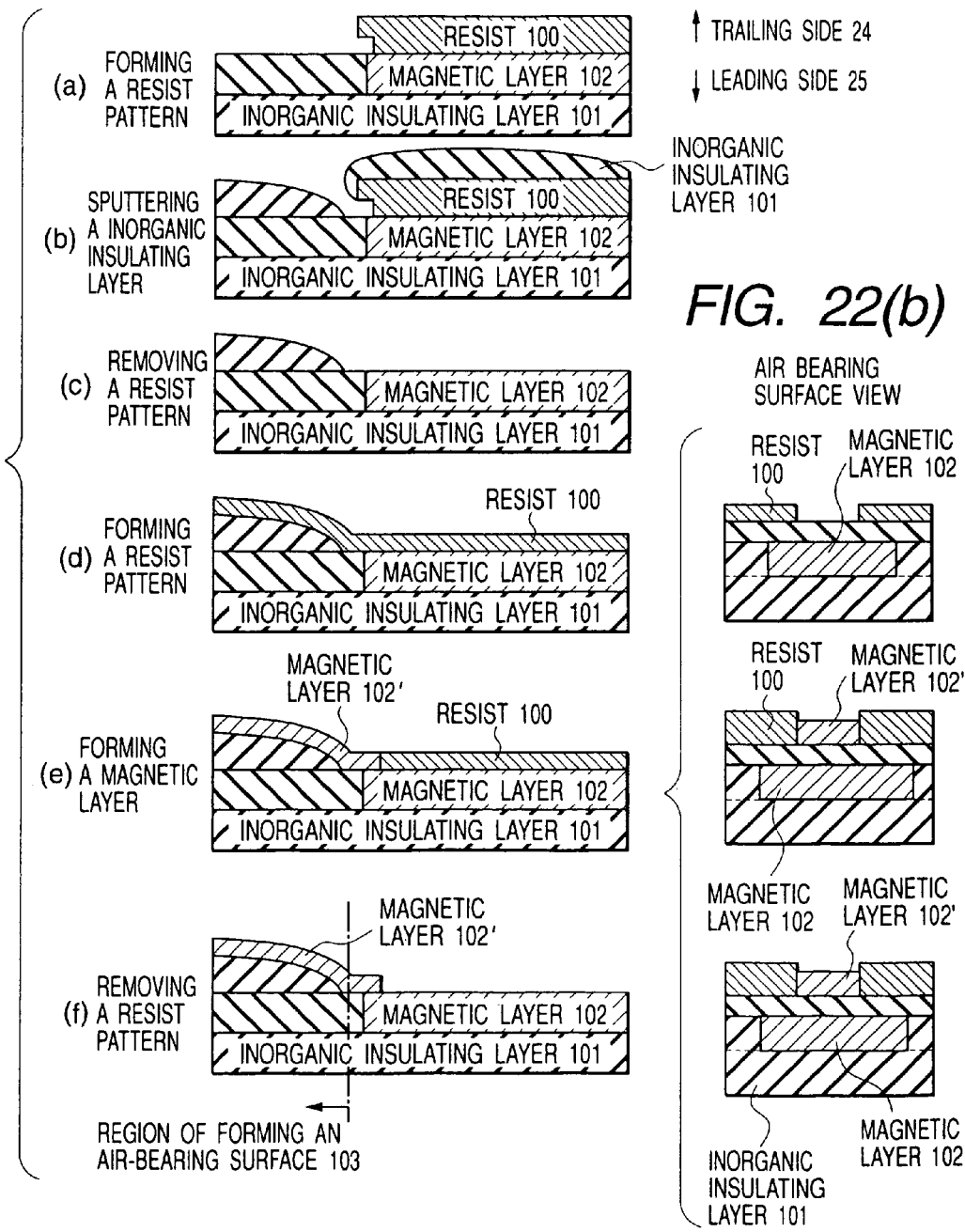

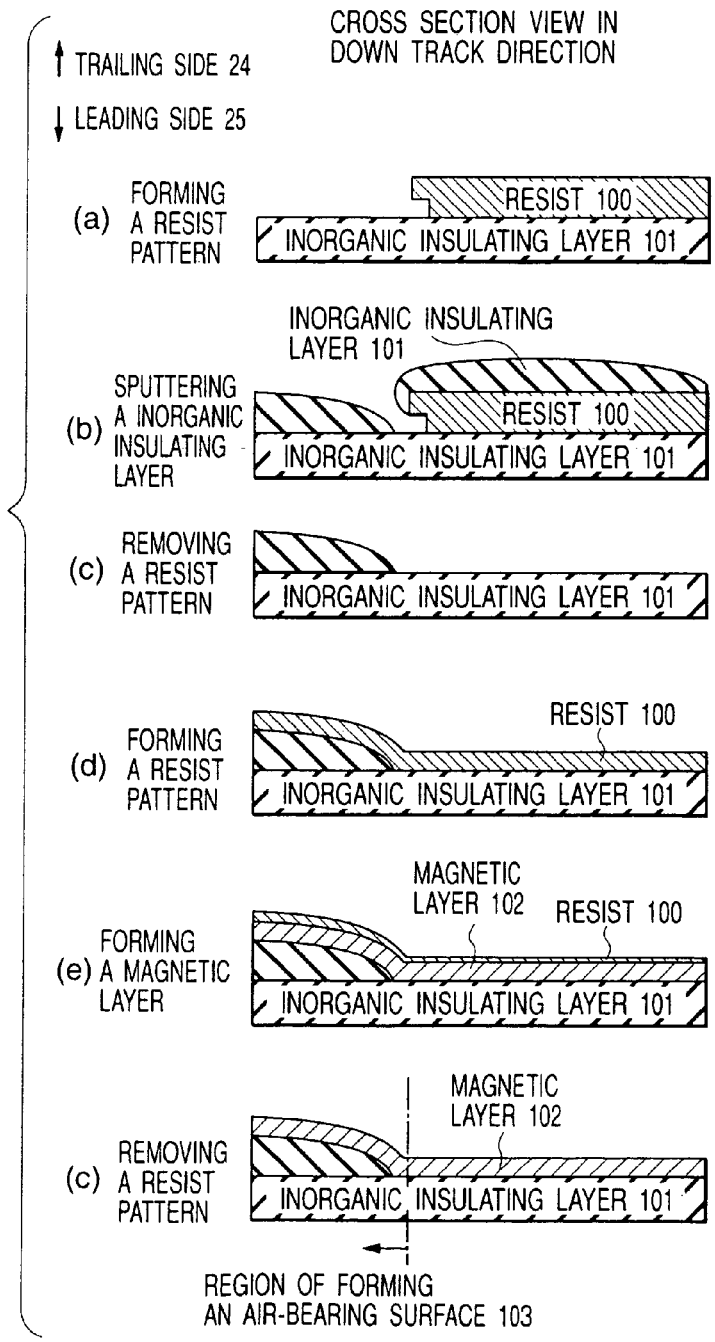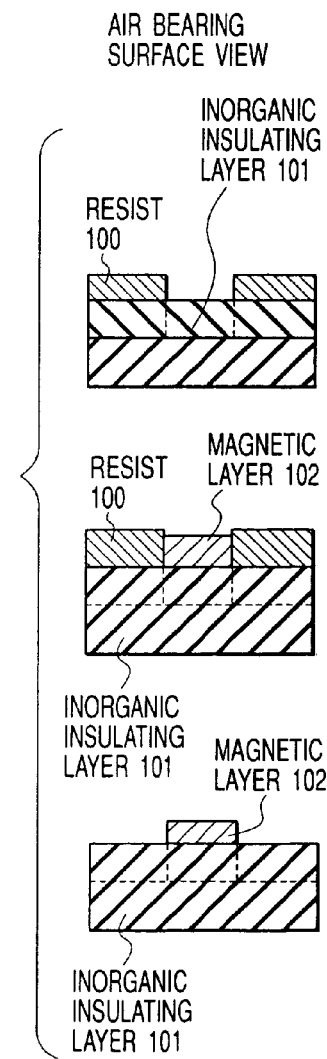

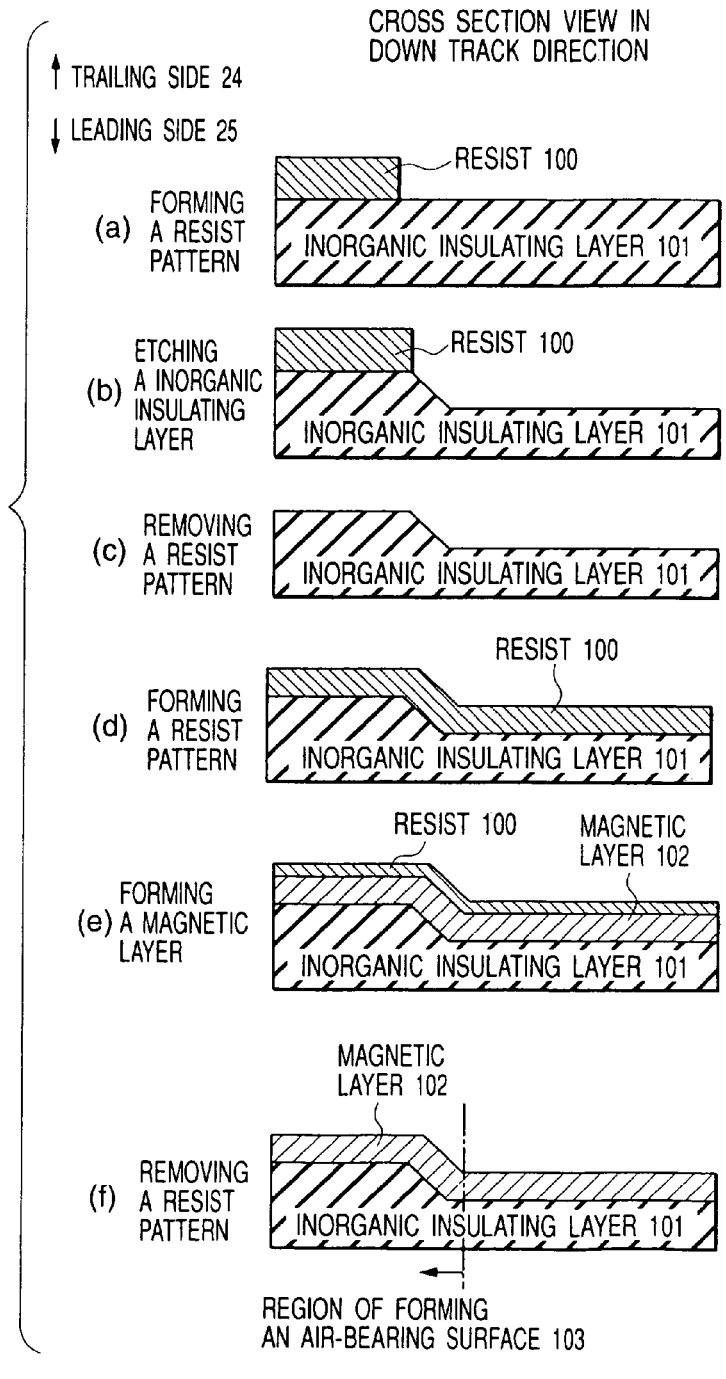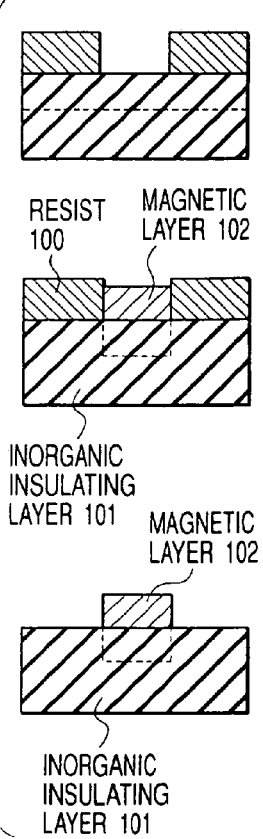

FABRICATION METHOD OF A HIGH GRADIENT-FIELD RECORDING HEAD FOR PERPENDICULAR MAGNETIC RECORDING

This is a continuation application of U.S. Ser. No. 10/862,582, filed Jun. 8, 2004, now abandoned which is a continuation of U.S. Ser. No. 10/076,432, filed Feb. 19, 2002, now U.S. Pat. No. 6,775,099.

BACKGROUND OF THE INVENTION

1. Field of the Invention

The present invention relates to a magnetic head for perpendicular recording and a magnetic disk apparatus equipped with the magnetic head for perpendicular recording.

2. Description of the Related Art

To increase a recording capacity per unit area of a magnetic disk, the bit length and the track width must be reduced to decrease the size of one bit cell as a minimum unit of recording information. In the current longitudinal recording system, however, there arises the problem that bit cell reduction loses a written signal due to the influence of thermal fluctuation. To solve this problem, a perpendicular recording system magnetizes a medium in the perpendicular direction to write signal information.

The recording head of a magnetic disk apparatus writes signal information onto a medium. In the perpendicular recording system, there are a system which uses a double-layered perpendicular medium having a soft magnetic underlayer and a system which uses a single-layer perpendicular medium not having an underlayer. A structure which combines a double-layered perpendicular medium with a single-pole head having a main pole and an auxiliary pole can apply a more intense magnetic field to a medium.

When the cross-sectional area of a main pole of a single-pole head is flux enhanced to the front end thereof, magnetic flux in the magnetic pole is concentrated on the front end of the main pole so that a locally intense magnetic field can be applied to a medium. When a pole tip having a high permeability is arranged on the front end of the main pole, the flow of magnetic flux at the front end of the main pole can be smooth. Further, the processing dimension accuracy at the front end of the main pole can be enhanced.

The example described in Japanese Published Unexamined Patent Application No. Hei 11-275188 discloses that when a main pole has a pole tip, arrangement of a pole tip and a main pole having the pole tip and arrangement of a pole tip and an auxiliary pole are defined so that the magnetic field gradient of a perpendicular magnetic field component on the trailing side can be improved. This prevents the influence of a magnetic field from the surface of the main pole having the pole tip opposite to a medium, but does not consider increase of the leakage magnetic flux by flux enhancing in the main pole and the pole tip.

SUMMARY OF THE INVENTION

In the above prior art, the leakage magnetic field is locally increased due to the influence of abrupt flux enhancing in the flux enhanced part in the main pole and the pole tip and particularly, the flux enhanced end in which the cross-sectional area of the main pole is smallest in the flux enhanced part, resulting in deterioration of the magnetic field gradient in a profile of a perpendicular magnetic field. In addition, the leakage magnetic field from the front or side surface of the main pole or the pole tip will also reduce the magnetic field gradient. An object of the present invention is to improve a magnetic field gradient in a distribution of a perpendicular magnetic field which writes the boundary of a bit cell, that is, a magnetic field gradient on the trailing side of a profile of a perpendicular magnetic field in the down track direction and a magnetic field gradient near both ends of a track of a profile of a perpendicular magnetic field in the cross track direction and to realize a high areal recording density by considering arrangement of the flux enhanced part or the flux enhanced end of a main pole or a pole tip and the front or side surface of the main pole or the pole tip.

In the present invention, part or all of the flux enhanced part or the flux enhanced end of a main pole or a pole tip is arranged on the leading side rather than a vertical plane including the trailing edge of the air bearing surface of the main pole so as to improve a magnetic field gradient of a profile of a perpendicular magnetic field on the trailing side and near both ends of a track width. In addition, the front or side surface of the main pole or the pole tip is arranged to the center of the main pole so as to improve a magnetic field gradient of the profile of a perpendicular magnetic field on the trailing side and near both ends of the track width.

BRIEF DESCRIPTION OF THE DRAWINGS

FIGS. 20(a) and 20(b) show schematic views of a main pole fabrication process according to an embodiment of the present invention (provided that the magnification is not uniform);

FIGS. 22(a) to 22(b) show schematic views of a main pole fabrication process according to an embodiment of the present invention (provided that the magnification is not uniform);

FIGS. 23(a) and 23(b) show schematic views of a main pole fabrication process according to an embodiment of the present invention (provided that the magnification is not uniform); and FIGS. 24(a) to 24(b) show schematic views of a main pole fabrication process according to an embodiment of the present invention (provided that the magnification is not uniform).

DETAILED DESCRIPTION OF THE PREFERRED EMBODIMENTS

Embodiment 1

Figure 2:
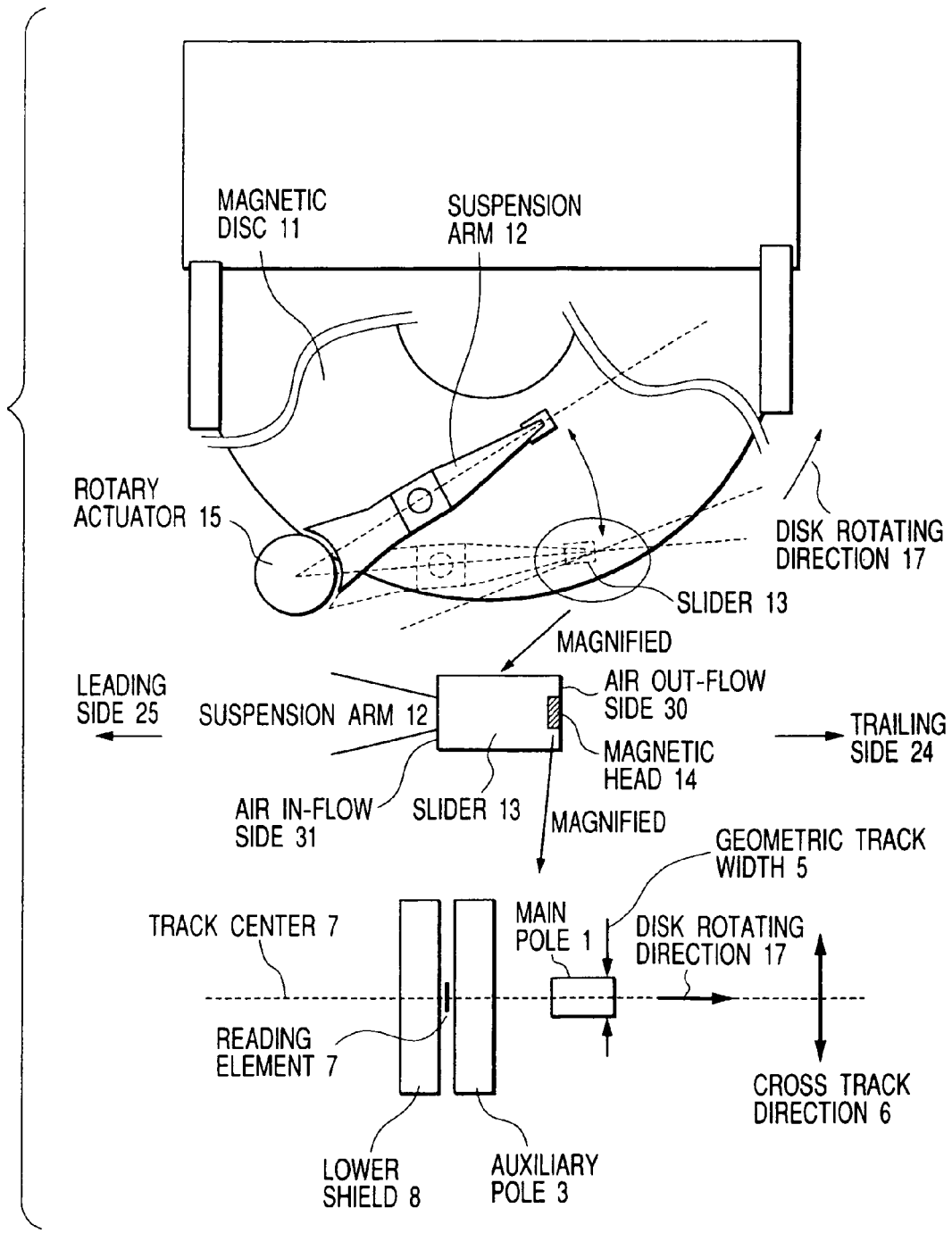
FIG. 2 is a schematic view of a magnetic head for perpendicular recording and a magnetic disk apparatus according to an embodiment of the present invention.
Figure 3A:
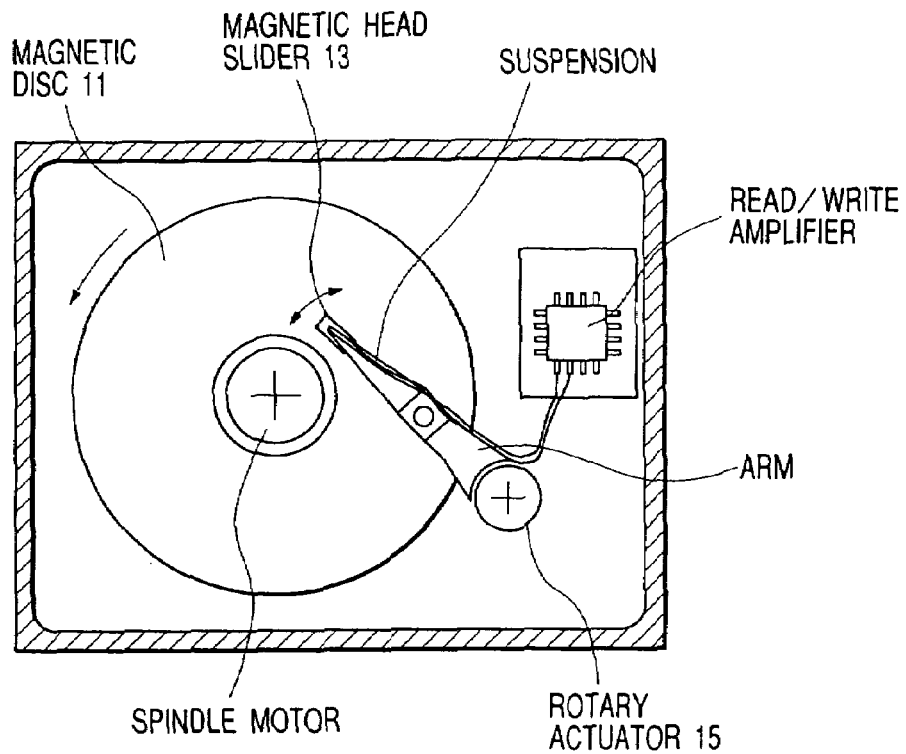
FIGS. 3(a) and 3(b) show schematic views of the magnetic disk apparatus according to the embodiment of the present invention.
Figure 3B:
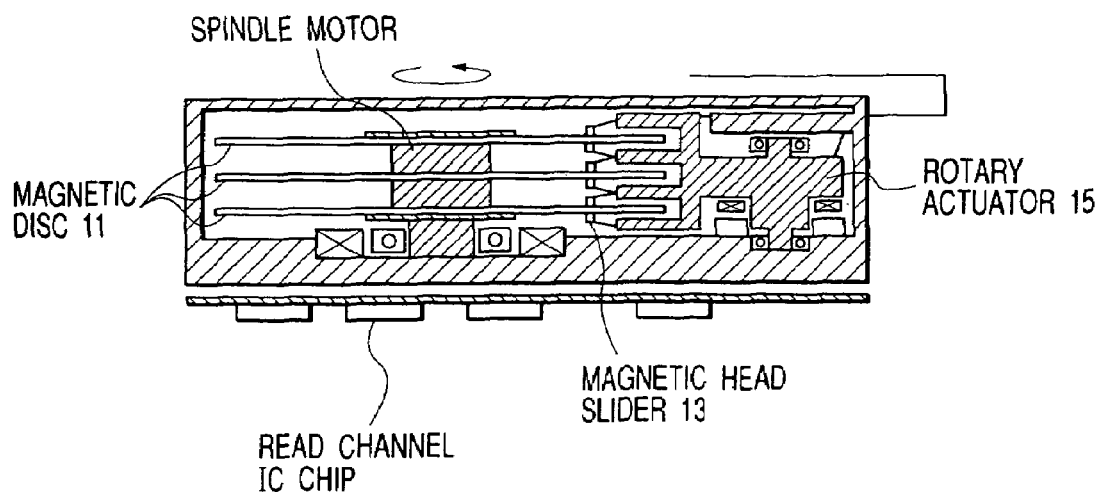

Embodiments of the present invention will be described hereinbelow with the drawings. FIG. 2 shows a schematic view of a magnetic disk apparatus using the present invention (provided that the magnification of the drawing is not uniform). The magnetic disk unit reads and writes a magnetization signal on a magnetic disk 11 by a magnetic head 14 attached to a slider 13 fixed onto the front end of a suspension arm 12. The direction of an air in-flow side 31.of the slider 13 is called a leading side. The direction of an air out-flow side 30 is called a trailing side. The direction to define a geometric track width 5 orthogonal to a disk rotating direction 17 is called a cross track direction 6. Gimbals, not shown, are formed at the front end of the suspension arm 12. FIG. 3 shows schematic views of the magnetic disk apparatus.

Figure 4:
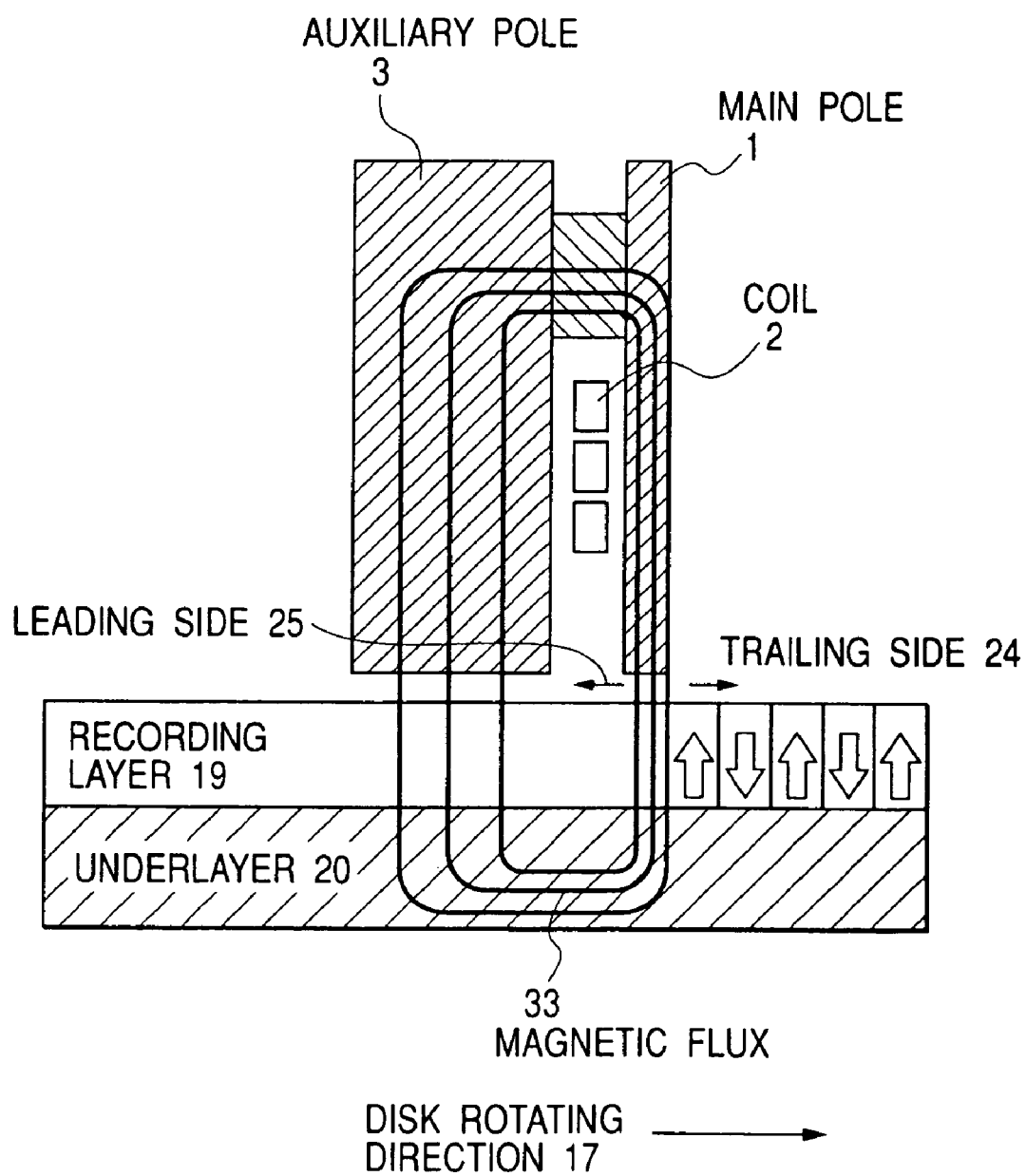
FIG. 4 is a schematic view of perpendicular recording.

FIG. 4 shows a schematic view of perpendicular recording. The downstream side in the rotating direction of a perpendicular magnetic recording medium is the trailing side, and the upstream thereof is the leading side. A magnetic circuit is formed such that magnetic flux 33 from a main pole 1 passes through a recording layer 19 and an underlayer 20 into an auxiliary pole 3. The cross-sectional area of the main pole 1 is smaller than that of the auxiliary pole 3. The magnetic flux is concentrated onto the front end of the main pole. A magnetization pattern is recorded onto a portion immediately under the main pole of the recording layer.

Figure 5A:
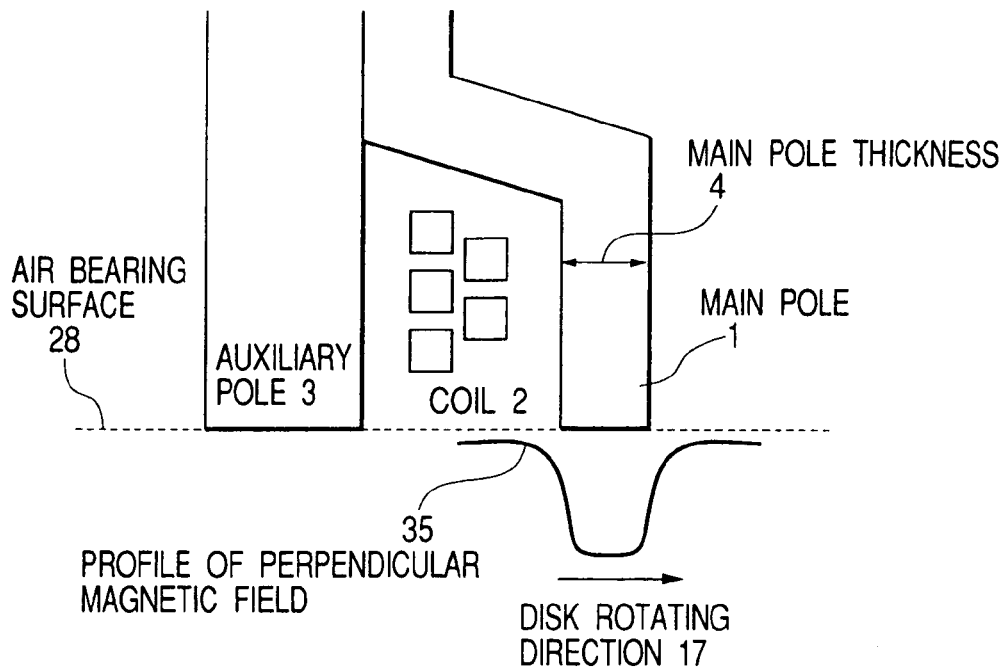
FIGS. 5(a) and 5(b) show schematic views of the magnetic head for perpendicular recording and profiles of a perpendicular magnetic field (a) in the disk rotating direction and (b) in the cross track direction.
Figure 5B:
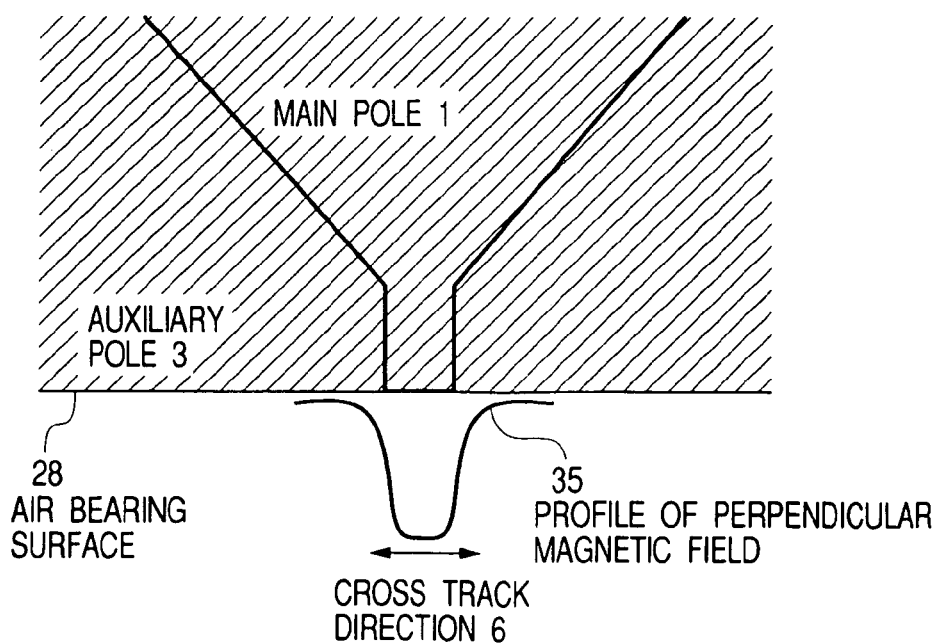

FIGS. 5(a) and 5(b) respectively show schematic views of a profile 35 of a perpendicular magnetic field in the magnetic disk rotating direction 17 and a profile 35 of a perpendicular magnetic field in the cross track direction 6 by a combination of a double-layered perpendicular medium having an underlayer and a single-pole head.

Figure 6A:
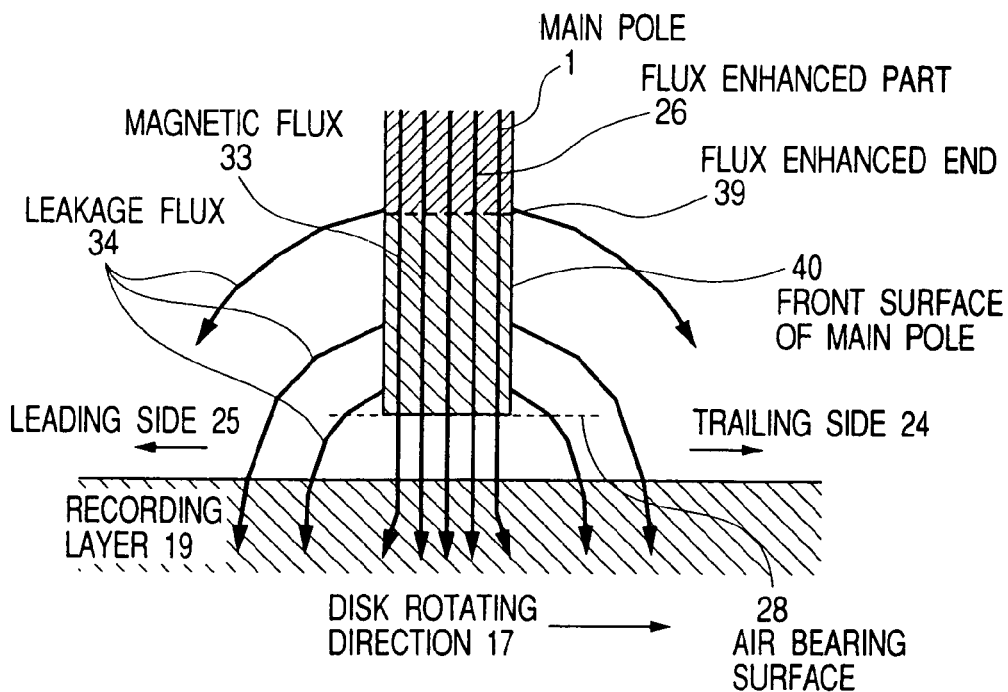
FIGS. 6(a) and 6(b) show schematic views of the flow of magnetic flux and leakage magnetic flux at the front end of a main pole (a) in the disk rotating direction and (b) in the cross track direction.
Figure 6B:
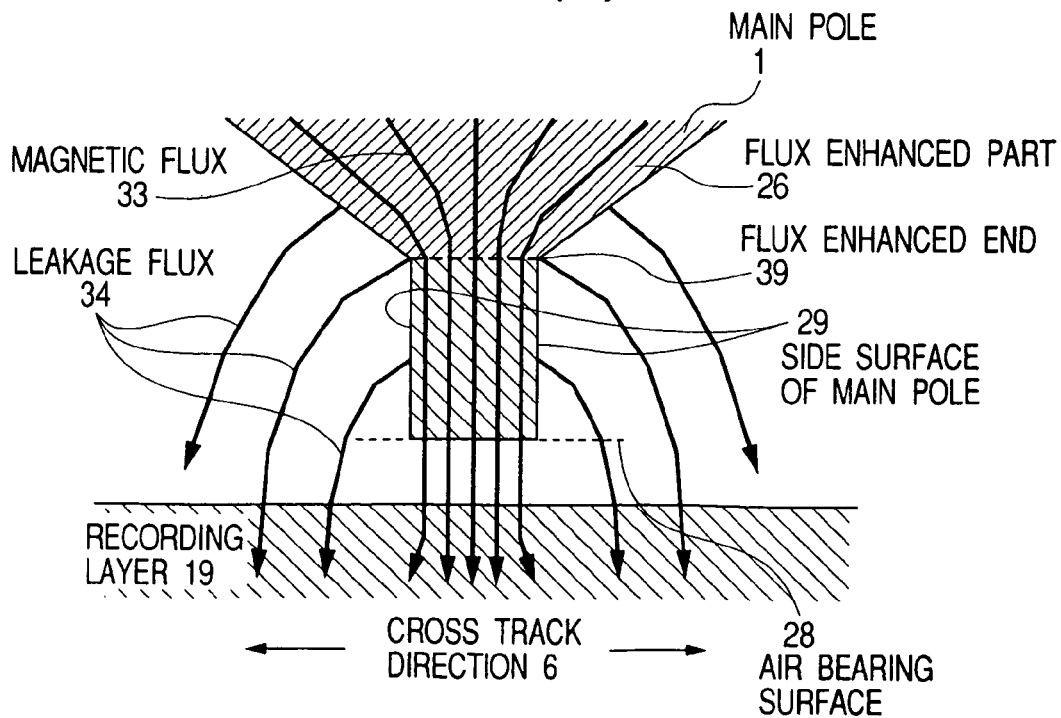

FIGS. 6(a) and 6(b) respectively show schematic views of the flow of magnetic flux in the disk rotating direction 17 and in the cross track direction 6 near the front end of the main pole. Near the front end of the main pole, there are a structure in which the area of the cross section in parallel with an air bearing surface 28 of the main pole is reduced, that is, a flux enhanced part 26, and a portion in which the degree of reducing the area of the cross section is changed, that is, a flux enhanced end 39. The magnetic field profile as shown in FIG. 5 is formed by the sum of magnetic flux flowed from the air bearing surface 28 of the main pole 1 to the recording layer 19 and magnetic flux leaked from the flux enhanced part 26 and the flux enhanced end 39 of the main pole and the front surface 40 and the side surface 29 of the main pole, that is, leakage magnetic flux 34.

Figure 1:
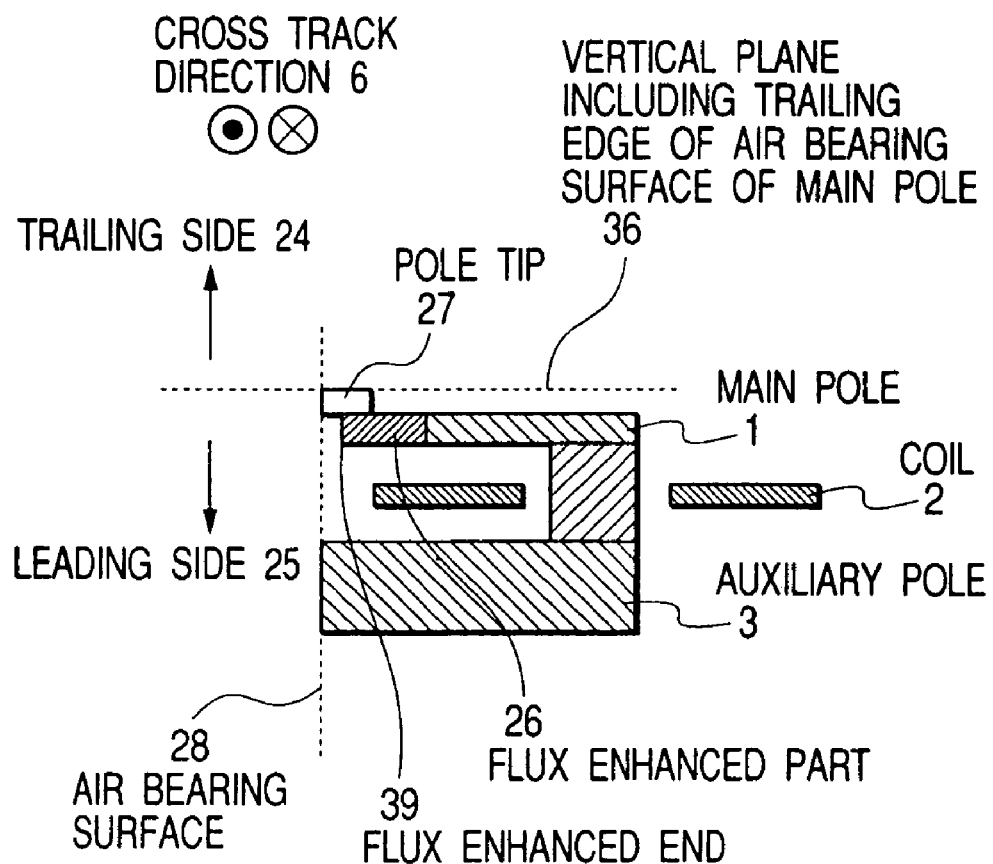
FIG. 1 is a schematic view of the section of a single-pole head for perpendicular recording according to an embodiment of the present invention.
Figure 7:
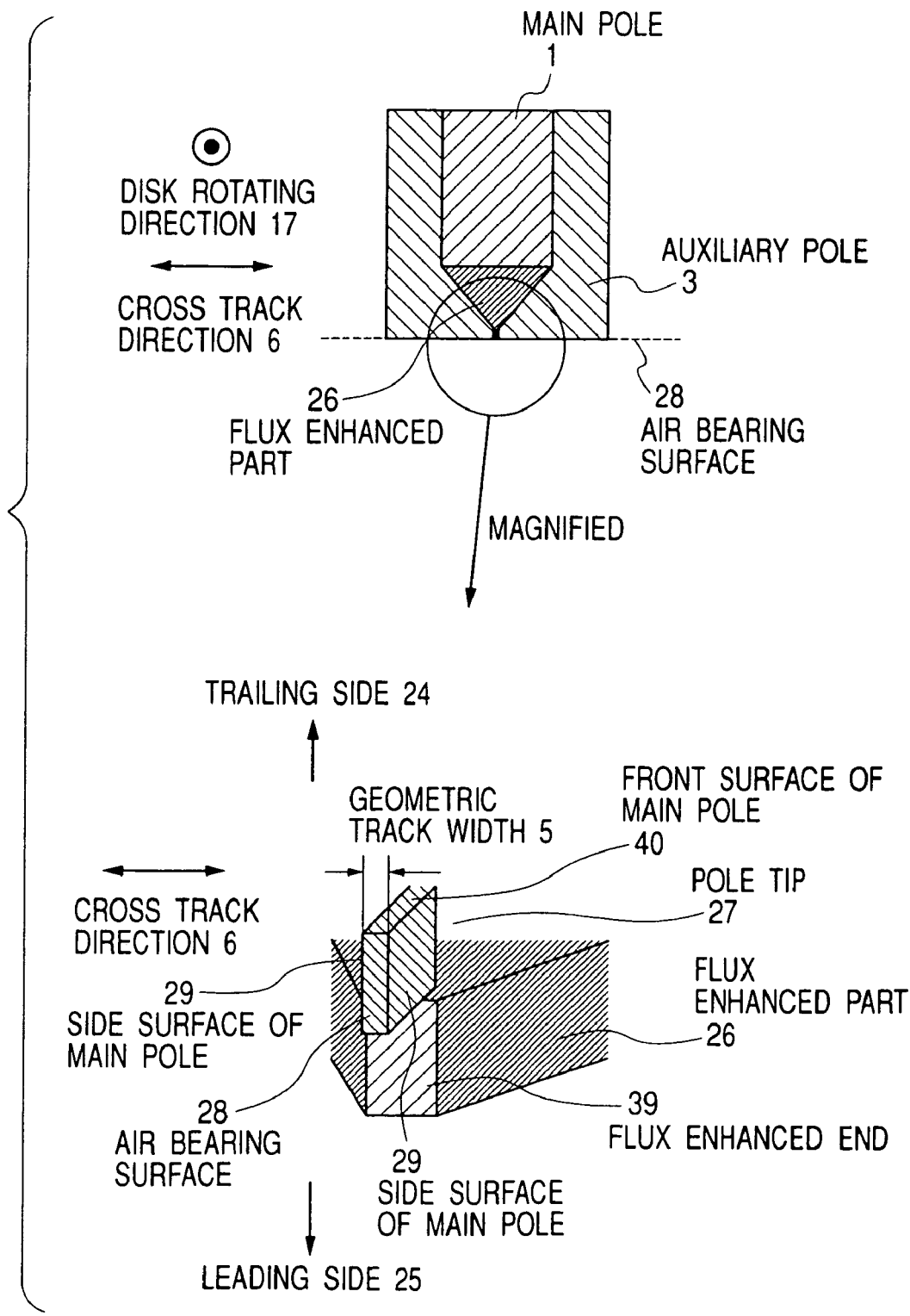
FIG. 7 shows schematic views of the flux enhanced part and the side surface of the main pole according to an embodiment of the present invention.

FIGS. 1 and 7 show schematic views of a structure near the front end of the main pole according to an embodiment of the present invention. As shown in FIG. 7, the main pole 1 has a portion exposed from the air bearing surface of the main pole to define a track width, that is, a pole tip 27, a portion whose cross section is decreased as it approaches the air bearing surface 28, that is, the flux enhanced part 26, and a portion in which the degree of reducing the cross-sectional area is changed, that is, the flux enhanced end 39. In the present invention, as shown in FIG. 1, the flux enhanced part 26 and the flux enhanced end 39 are arranged on a leading side 25 with respect to the pole tip 27.

Figure 8A:
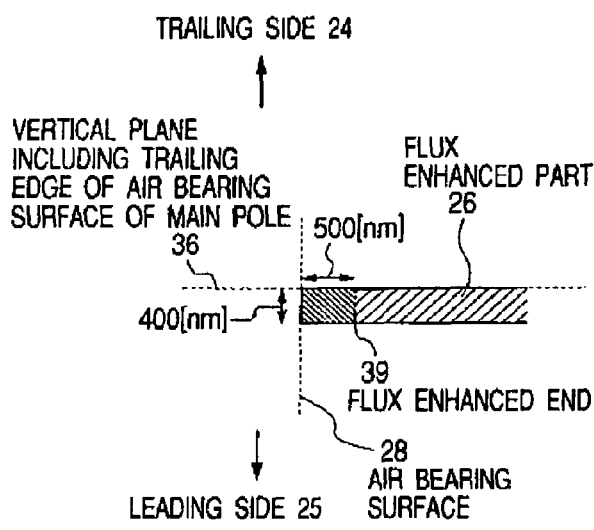
FIGS. 8(a) to 8(c) show schematic views of structures near the front end of the main pole of (1) a conventional type and (2) this invention of a magnetic head for perpendicular recording for use in a three dimensional integral method simulation.
Figure 8B:
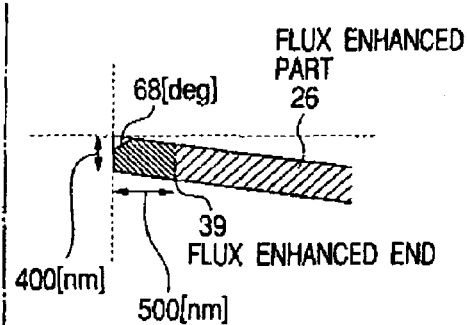
Figure 8C:
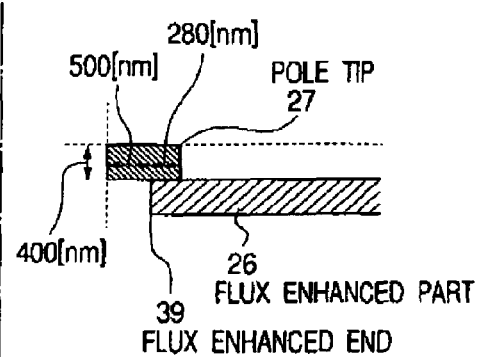

Using the results calculated from a three dimensional integral method, profiles of a perpendicular magnetic field of heads of conventional type and this embodiment are compared. FIG. 8 shows schematic views of the cross section near the front end of the main pole in the head structures used in the calculation. FIG. 8(A) shows a structure near the front end of the main pole in the conventional type head. FIG. 8(B) shows a structure according to this invention in which the front surface on the trailing side of the main pole in FIG. 8(A) is tilted so that the flux enhanced part 26 and the flux enhanced end 39 of the main pole are arranged on the leading side rather than a vertical plane in parallel with the cross track direction including the trailing edge of the air bearing surface of the main pole, and is envisaged in order to confirm the effect of arrangement in the present invention. FIG. 8(C) shows a structure according to this invention in which the flux enhanced part 26 and the flux enhanced end 39 are moved backward and arranged on the leading side rather than the pole tip.

Figure 9:
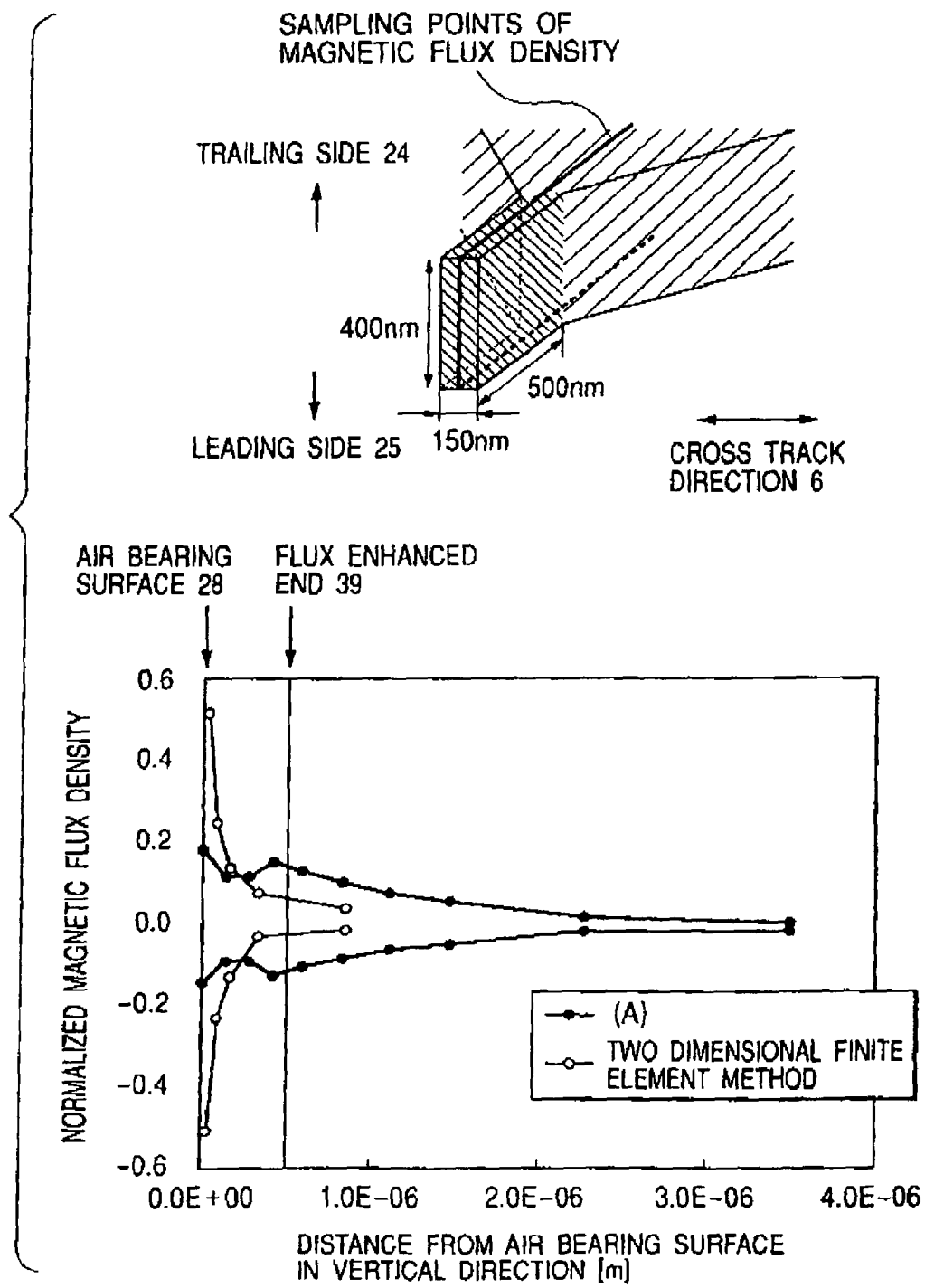
FIG. 9 is a distribution of magnetic flux density of the magnetic pole surface near the front end of the main pole in the conventional type head.

FIG. 9 shows a distribution of magnetic flux density of the magnetic pole surface of the conventional type head of FIG. 8(A). The thick line indicates values in which a component of magnetic flux density perpendicular to the magnetic pole surface traced from the air bearing surface in the vertical direction in the center of the front surface of the main pole is normalized by a component of perpendicular magnetic flux density near the center of the air bearing surface of the main pole. For comparison, the thin line indicates normalized components of magnetic flux density calculated by a finite element method in a two dimensional head in which an in-plane structure in the disk rotating direction is assumed and the flux enhanced part and the flux enhanced end are not considered. In the head without the flux enhanced part and the flux enhanced end, the magnetic flux density is abruptly decreased as leaving from the air bearing surface of the main pole. In the three dimensional head structure, the magnetic flux density leaked by flux enhancing is not monotonously decreased, but is maximum near the flux enhanced end. The flux enhancing increases the magnetic field intensity. On the other hand, the leakage magnetic flux from near the flux enhanced end results in deterioration of the magnetic field gradient not seen in the head without the flux enhanced part and the flux enhanced end. Here is shown the distribution of magnetic flux density of the magnetic pole surface on the trailing side and the leading side of the flux enhanced part and the flux enhanced end. This is the same for the magnetic pole surface intersecting the cross track direction.

Figure 10A:
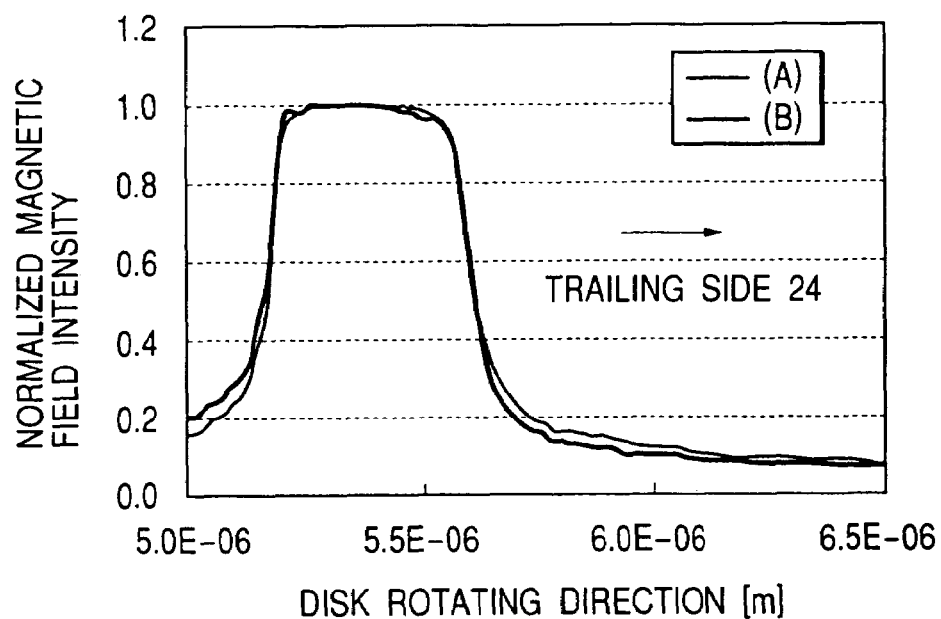
FIGS. 10(a) and 10(b) show profiles of a perpendicular magnetic field in the disk rotating direction by the three dimensional integral method simulation according to an embodiment of the present invention ((B),(C))and the conventional (A) type head.
Figure 10B:
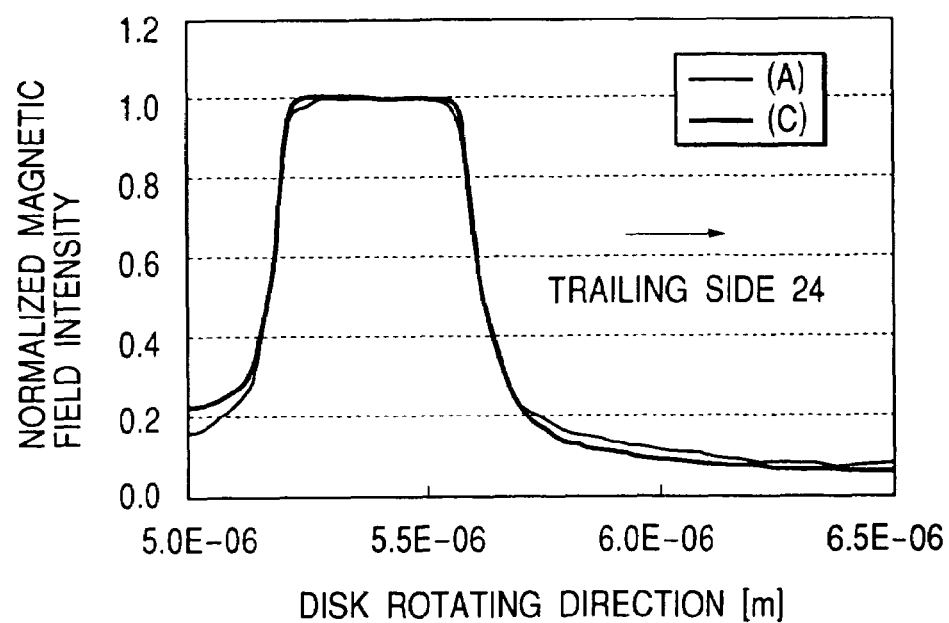

FIG. 10 shows the profiles 35 of the normalized perpendicular magnetic field in the disk rotating direction 17 in the center of the thickness direction of the recording layer and a track center 7 in the respective structures of FIG. 8. A magnetic spacing from the air bearing surface of the main pole to the surface of the recording layer 19 is 15 nm. A film thickness of a portion exposed to the air bearing surface of the main pole or the pole tip is 400 nm. A geometric track width is 150 nm. A saturation magnetic flux density of the main pole and the pole tip is 1.8T(tesla). As compared with the conventional type (A), the magnetic field intensity is lowered at the skirt of the profile on the trailing side in the structures (B) and (C) according to this invention. This is because the structures according to this invention decrease the influence of the leakage magnetic flux from the flux enhanced part and the flux enhanced end of the main pole and the front surface of the main pole.

TABLE 1

| | Maximum magnetic field [kOe] | Field gradient [Oe/nm] @ 5.0[kOe] | Normalized field gradient ×10³[1/nm] @ 5.0[kOe] | Transition width [nm] | Linear density [kFCI] |
|---|---|---|---|---|---|
| (A) | 12.3 | 53.3 | 4.33 | 46.5 | 546 |
| (B) | 11.9 | 60.1 | 5.05 | 38.6 | 656 |
| (C) | 11.4 | 58.8 | 5.16 | 45.6 | 558 |

Table 1 shows field gradients on the trailing side normalized by the maximum magnetic field of the profiles 35 of the perpendicular magnetic field of the three structures of FIG. 8. In consideration of the case of writing onto a medium having a coercive field of 5 kOe, the field gradients of the perpendicular magnetic field component on the trailing side at a field intensity of 5 kOe are compared. In the structures according to this invention of FIG. 8, as compared with the conventional type (A), the normalized field gradients are improved in the order of (B) and (C). Further, effects given to read-write characteristic by the profile 35 of the perpendicular magnetic field are compared using transition width.

Figure 11:
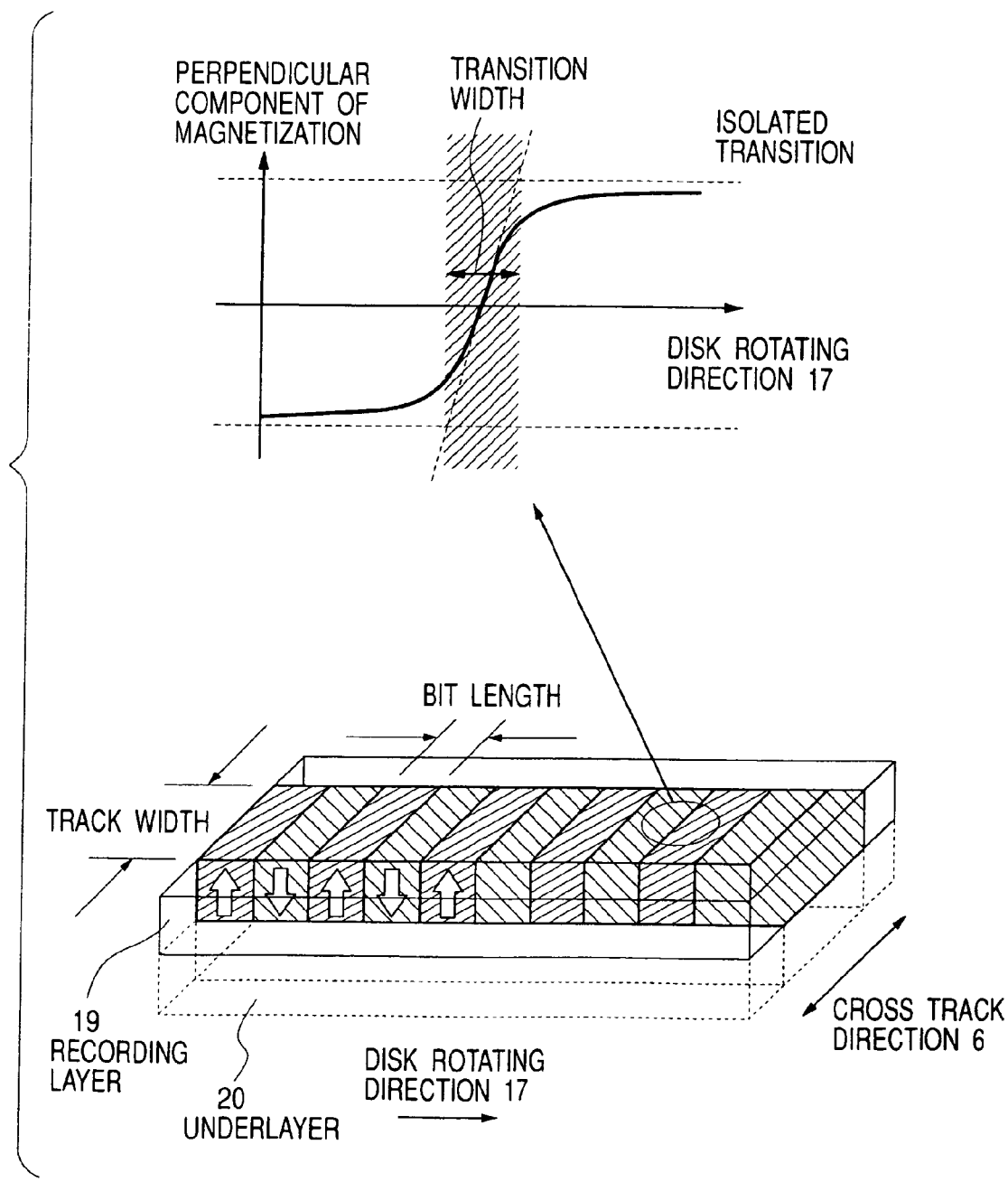
FIG. 11 is a schematic view of a magnetic transition width.

Table 1 shows transition widths predicted when assuming the respective magnetic field profiles. A medium having a coercive field of 5 kOe, a saturation magnetization of 250 emu/cm³, and a recording layer film thickness of 20 nm is assumed here. An overview of a read/write characteristic prediction tool corresponding to a perpendicular recording system used for calculating the transition width has been presented in The 23rd Japan Applied Magnetics Society's Scientific Lecture 5aB-6 (1999). The transition width is a variable showing the transition region of isolated transition, as shown in FIG. 11. A magnetization pattern showing signal information at a predetermined recording density is assumed to be represented by linear superposition of the isolated transition. To realize read/write within the range of a predetermined error rate, it can be considered that the transition width must be below the bit length. As shown in Table 1, as compared with the conventional type (A), in this invention (B), the transition width is reduced and the linear density capable of read/write in which the transition width is assumed to be equal to the bit length is enhanced by about 100 kFCI (Flux Change per Inch) when expressed by the transition number per 1 inch. In the structure (C) according to this invention, since the maximum magnetic field is about 1 kOe smaller than that of the conventional type (A), the field gradient before normalization is lower than that of (B) and the linear density capable of read/write to be assumed is lower than that of (B). Still (C) is the most effective structure with respect to the normalized field gradient. Under the conditions that an equal maximum magnetic field is provided by fine adjusting an electric current of a coil or the structure near the main pole, the linear density capable of read/write to be assumed can be expected higher than that of (B). With MKSA unit, 1 Oe=79.6 A/m, 1 emu=1.257×10$^{-7}$ Wb, and 1 inch=2.54×10$^{-2}$ m.

Figure 12A:
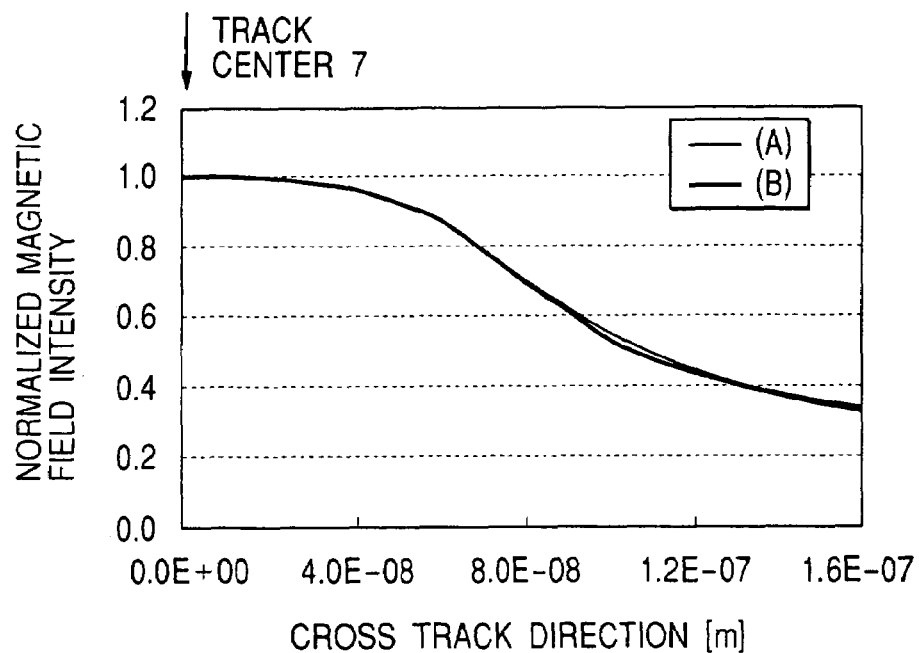
FIGS. 12(a) and 12(b) show profiles of a perpendicular magnetic field in the cross track direction by the three dimensional integral method simulation according to an embodiment of the present invention ((B),(C)) and the conventional (A) type head.
Figure 12B:
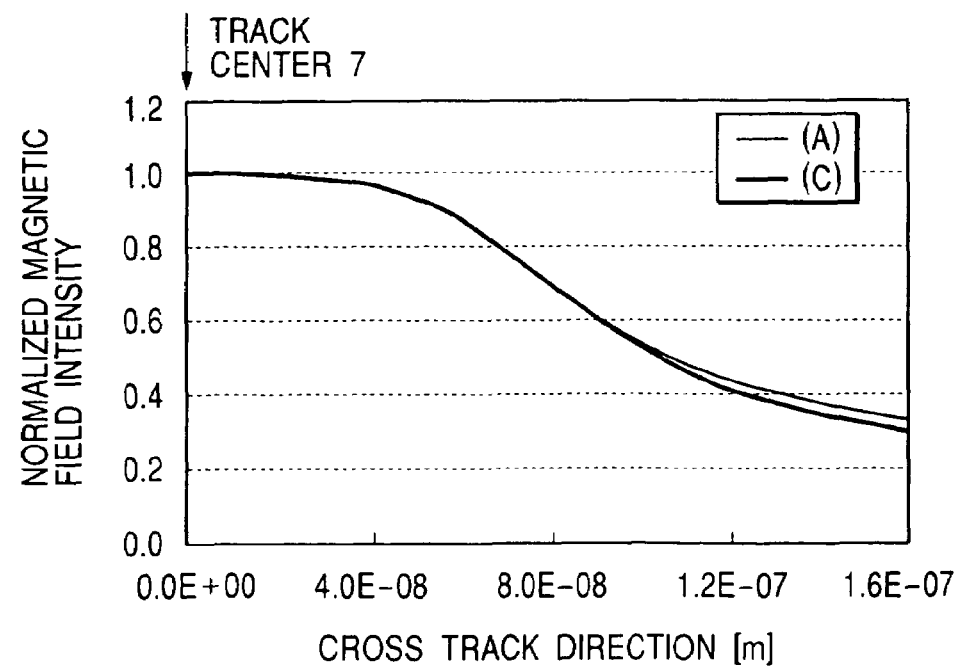

In the invention of FIG. 8, the flux enhanced part 26 and the flux enhanced end 39 are arranged on the leading side as compared with the conventional type so that the profile of the perpendicular magnetic field in the cross track direction 6 near the trailing edge of the air bearing surface of the main pole can be also improved. FIG. 12 shows the profiles 35 of the perpendicular magnetic field from the track center in the single-side cross track direction in the center in the thickness direction of the recording layer immediately under the trailing edge of the air bearing surface of the main pole. As compared with the conventional type (A), in (B), the magnetic field of the bottom portion of the magnetic field profile is found to be small. The influence of the leakage magnetic flux from the flux enhanced part 26 and the flux enhanced end 39 can be reduced at the edge of the track, thus the field gradient can be enhanced and the magnetization transition region can be small. In the structure (C), the arrangement of the flux enhanced part 26 and the flux enhanced end 39 is limited as compared with the structure of FIG. 8(B). As shown in FIG. 8(C), the flux enhanced part 26 and the flux enhanced end 39 are arranged on the leading side rather than a vertical plane in parallel with the cross track direction including the leading edge of the air bearing surface of the main pole. It is thus possible to improve the field gradient in the profile 35 of a perpendicular magnetic field in the cross track direction immediately under the trailing edge and over the entire air bearing surface of the main pole.

Embodiment 2

Figure 13:
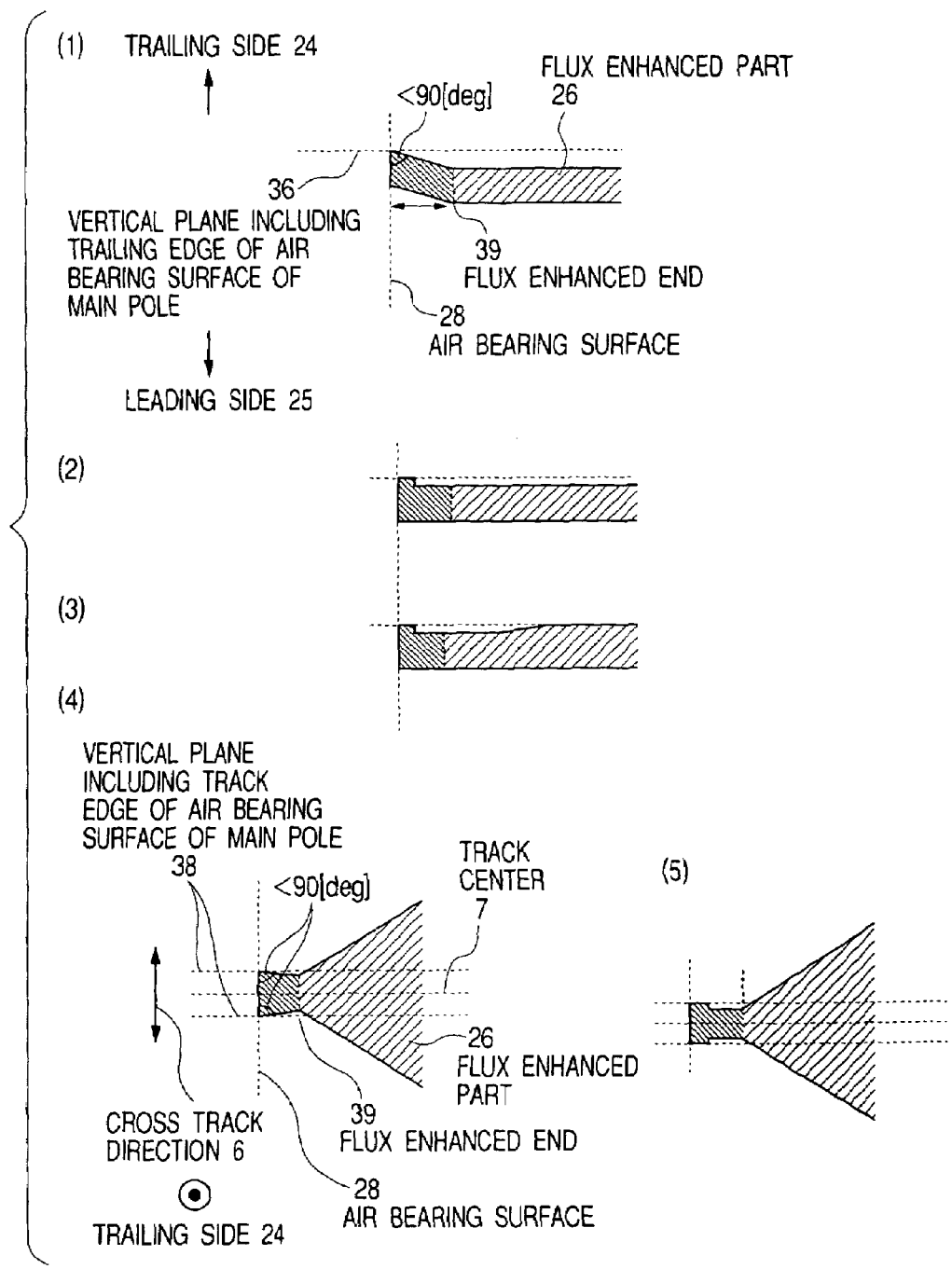
FIG. 13 shows schematic views with respect to arrangement of the flux enhanced part of a main pole and the side surface of the main pole, in the main pole not having a pole tip according to an embodiment of the present invention.

FIGS. 13 to 17 list the embodiments of the present invention. In FIG. 13, there are shown structures of the main pole not having the pole tip. In FIG. 13(1), the front surface of the main pole on the trailing side intersecting the air bearing surface of the main pole is tilted so that the flux enhanced part 26 and the flux enhanced end 39 are arranged on the leading side rather than a vertical plane 36 in parallel with the cross track direction including the trailing edge of the air bearing surface of the main pole. In FIG. 13(2), the front surface of the main pole on the trailing side is arranged on the leading side by leaving a portion to define a track width and the trailing edge, and at the same time, the flux enhanced part 26 and the flux enhanced end 39 are arranged on the leading side rather than the vertical plane 36 in parallel with the cross track direction including the trailing edge of the air bearing surface of the main pole. Here, the front surface of the main pole is moved backward to the leading side stepwise, but may be gently moved backward. In FIGS. 13(1) and 13(2), the side surface of the main pole, the flux enhanced part and the flux enhanced end are wholly arranged on the leading side. Part of the side surface of the main pole, for example, part of the flux enhanced part 26 on which magnetic flux is likely to be concentrated near the flux enhanced end 39 may be arranged on the leading side as shown in FIG. 13(3) to obtain the effect.

When the arrangement of FIGS. 13(1) to 13(3) is further limited, the flux enhanced part 26 and the flux enhanced end 39 are arranged on the leading side rather than the vertical plane in parallel with the cross track direction including the edge of the leading side of the air bearing surface of the main pole, the influence of the leakage magnetic flux from the flux enhanced part 26 and the flux enhanced end 39 can be prevented over the entire air bearing surface of the main pole. The profile 35 of a perpendicular magnetic field in the cross track direction can be improved over the entire air bearing surface of the main pole.

In the arrangement of the flux enhanced part 26 and the flux enhanced end 39 of FIGS. 13(1) and 13(2), the front surface of the main pole on the trailing side is also arranged on the leading side rather than the vertical plane 36 in parallel with the cross track direction including the trailing edge of the air bearing surface of the main pole. In other words, the influence of the leakage magnetic flux from the front surface of the main pole on the trailing side as well as the flux enhanced part and the flux enhanced end is prevented. In the same manner as FIGS. 13(1) to (3), as shown in FIGS. 13(4) and 13(5), the side surface of the main pole intersecting the cross track direction is tilted and moved backward by leaving a portion to define a track width so as to be arranged on a track center 39 side rather than a vertical plane 38 perpendicular to the cross track direction including the edge of the track of the trailing edge of the air bearing surface of the main pole. The arrangement of the side surface of the main pole intersecting the cross track direction can be combined with the respective structures of FIGS. 13(1) to 13(3).

When the number of the flux enhanced parts and the flux enhanced ends is not one, the effect can be obtained in any position by considering the arrangement described here. Arrangement for a position near the air bearing surface or the vicinity of a position having a large flux enhanced angle is considered to obtain a large effect.

Embodiment 3

Figure 14:
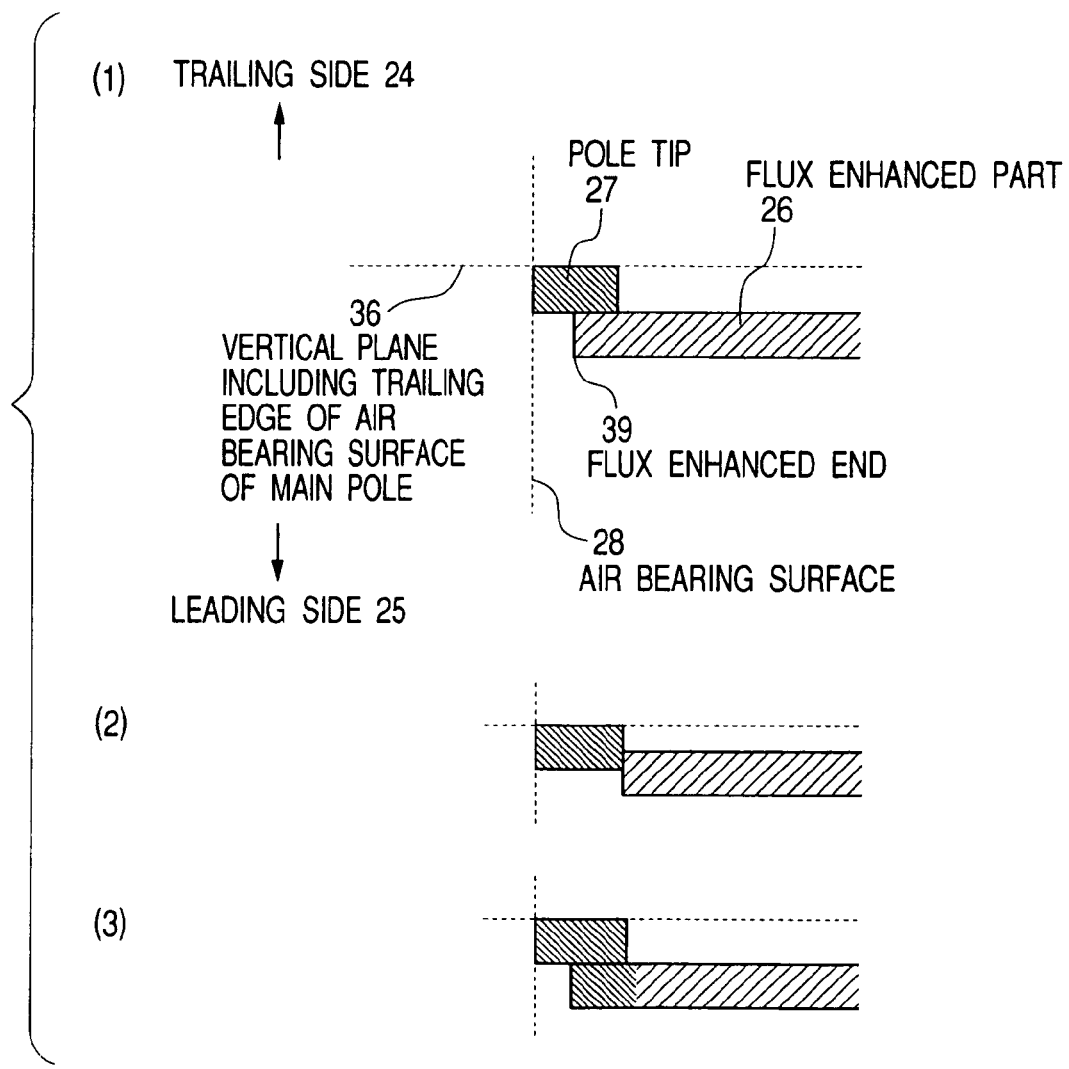
FIG. 14 shows schematic views with respect to arrangement of a main pole, in the main pole having a pole tip according to an embodiment of the present invention.
Figure 15:
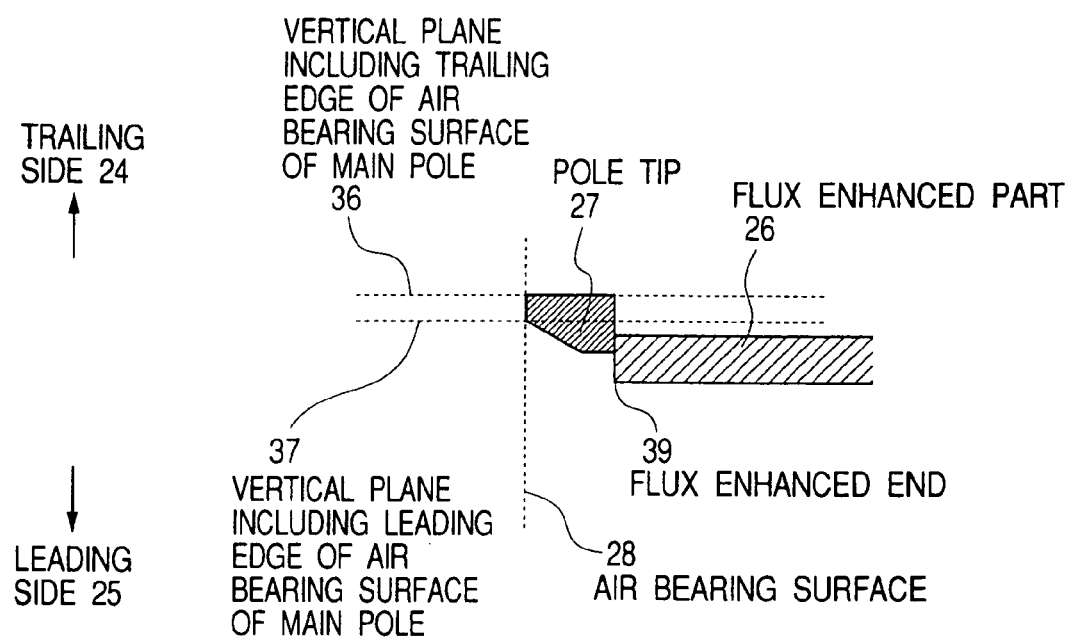
FIG. 15 is a schematic view with respect to arrangement of the air bearing surface of a main pole and the main pole, in the main pole having a pole tip according to an embodiment of present invention.
Figure 16:
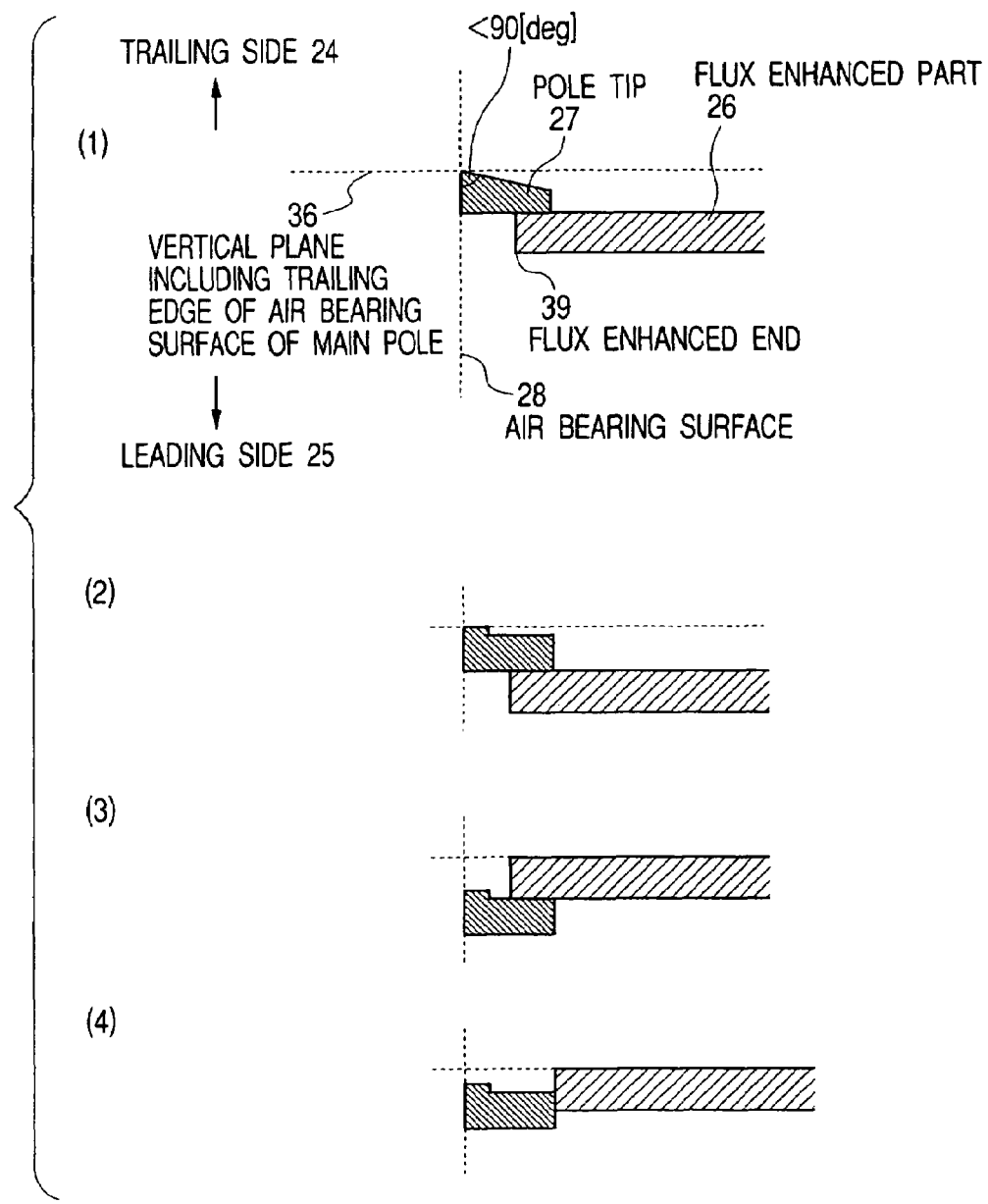
FIG. 16 shows schematic views with respect to arrangement of the side surface of a main pole, in the main pole having a pole tip according to an embodiment of the present invention.

FIGS. 14 to 16 respectively show structures when the main pole has the pole tip 27. When the pole tip is provided, it can be expected that the accuracy of the track width in the production process is enhanced, and magnetic domain control and a high Bs material such as 55% Fe-45% Ni having a saturation magnetic flux density of 1.6T or CoNiFe having a saturation magnetic flux density of 2.2T, or the like are used to improve the magnetic field intensity. In addition, the distance between the main pole and the soft magnetic underlayer is adjusted or the contact area of the pole tip with the main pole is adjusted, whereby the magnetic field intensity can be increased. Also in the case that the main pole has the pole tip 27, in order to prevent the leakage magnetic field, an arrangement in which the flux enhanced part 26 and the flux enhanced end 39 are as far as possible from the trailing edge of the pole tip is considered. In FIGS. 14(1) and 14(2), the flux enhanced part 26 and the flux enhanced end 39 are arranged on the leading side rather than the vertical plane 36 in parallel with the cross track direction including the trailing edge of the air bearing surface of the pole tip 27. The arrangement of FIG. 14(2) can be applied to any of the following examples. As shown in FIG. 14(3), the positions of the flux enhanced part 26 and the flux enhanced end 39 in the main pole are considered likewise.

The arrangement is further defined so that the flux enhanced part 26 and the flux enhanced end 39 are arranged on the leading side rather than the vertical plane in parallel with the cross track direction including the edge of the leading side of the air bearing surface of the pole tip. The influence of the leakage magnetic flux from the flux enhanced part 26 and the flux enhanced end 39 over the entire air bearing surface of the main pole can be prevented. The profile 35 of a perpendicular magnetic field in the cross track direction can be improved over the entire air bearing surface of the main pole. For example, FIGS. 14(1) and 14(3) satisfy this condition, and as compared with FIG. 14(2), the profile 35 of a perpendicular magnetic field component in the cross track direction can be improved over the entire air bearing surface of the main pole. As shown in FIG. 15, when the pole tip is not hexahedral, the flux enhanced part 26 and the flux enhanced end 39 are arranged on the leading side rather than the vertical plane in parallel with the cross track direction including the edge of the leading side of the air bearing surface of the pole tip so as to obtain the same effect over the entire air bearing surface of the main pole.

In FIGS. 16(1) and 16(2), the front surface on the trailing side of the pole tip is tilted in the same manner as FIGS. 13(1) and 13(2), and is arranged on the leading side by leaving a portion to define a track width and the trailing edge so as to be arranged on the leading side rather than the vertical plane 36 in parallel with the cross track direction including the trailing edge of the air bearing surface of the pole tip.

Figure 17:
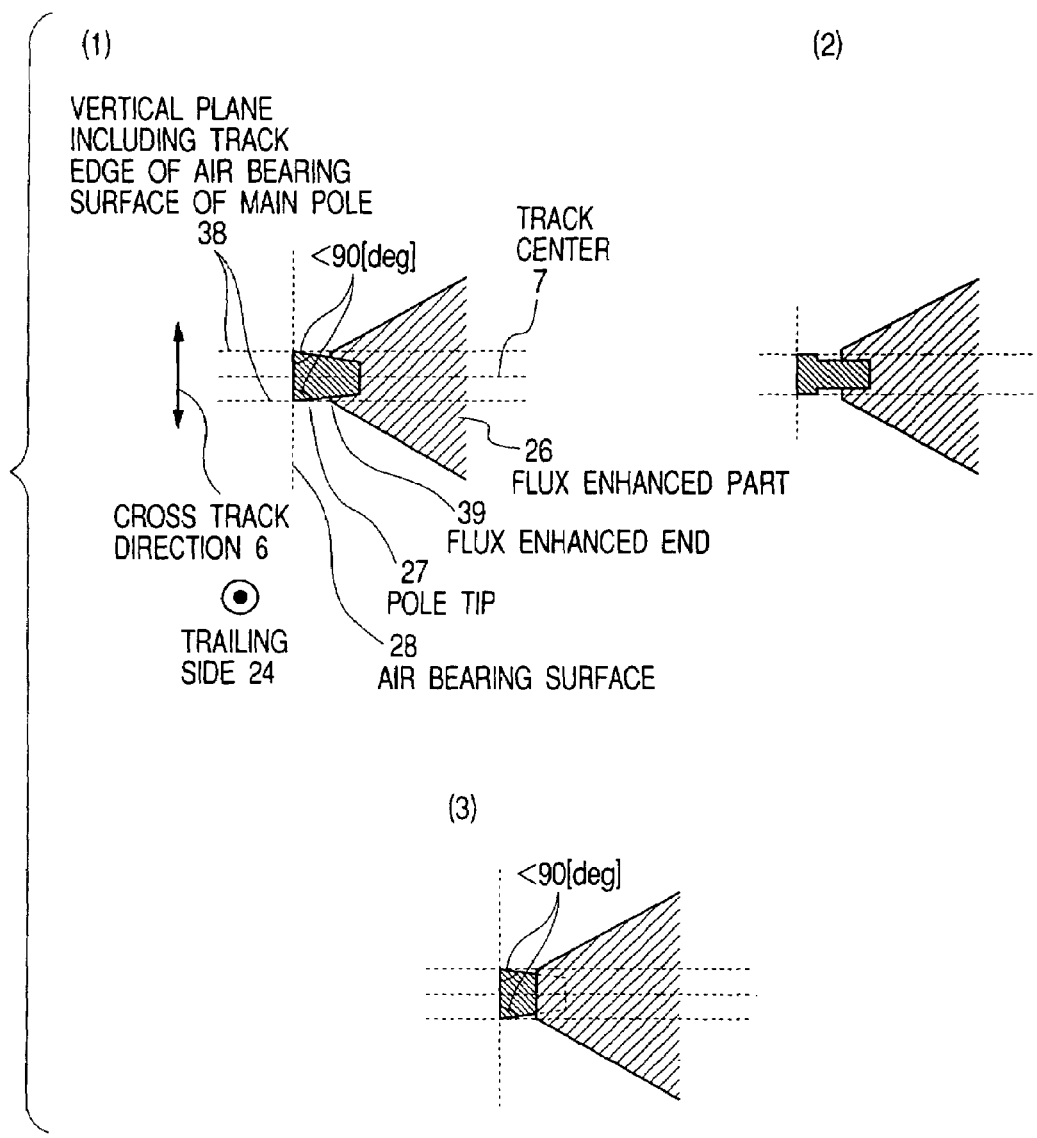
FIG. 17 shows schematic views with respect to arrangement of the side surface of a main pole intersecting the cross track direction, in the main pole having a pole tip according to an embodiment of the present invention.

In FIG. 17, in the same manner as FIGS. 13(4) and 13(5), the side surface of the pole tip intersecting the cross track direction is tilted and is moved backward by leaving a portion to define a track width so as to be arranged on the track center 39 side rather than the vertical plane 38 perpendicular to the cross track direction including the edge of the track of the trailing edge of the air bearing surface of the pole tip. The arrangement of the side surface of the main pole intersecting the cross track direction can be combined with the respective structures of FIGS. 14 to 15. The effect for suppressing the leakage magnetic flux from the side surface intersecting the cross track direction can be obtained when the flux enhanced part and the flux enhanced end are arranged on the trailing side rather than the pole tip, as shown in FIG. 17(3).

Embodiment 4

Figure 18:
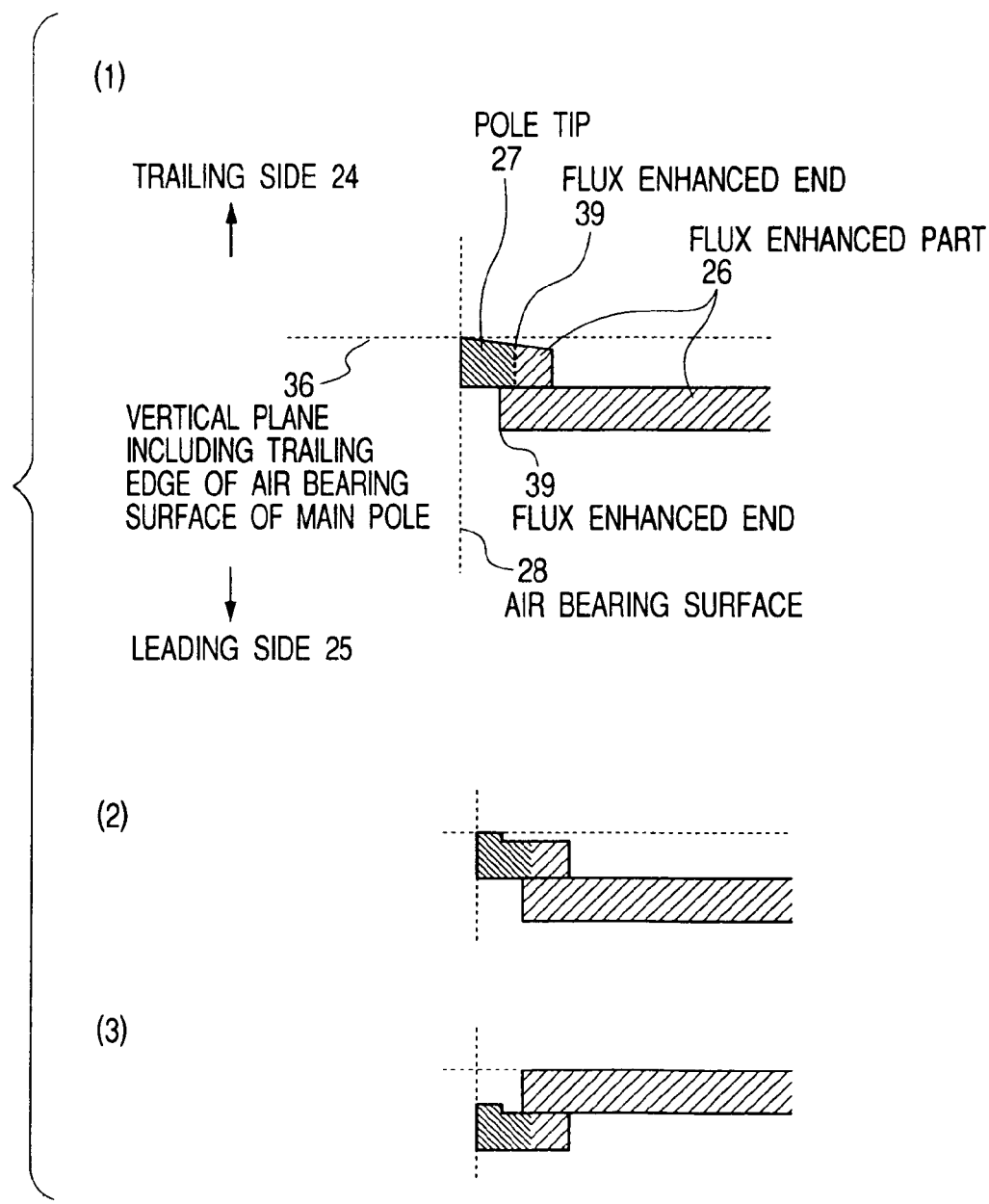
FIG. 18 shows schematic views with respect to arrangement of the flux enhanced part and the side surface of a main pole in a pole tip having a flux enhanced part, in the main pole having a pole tip according to an embodiment of the present invention.

Embodiment 4 shows an embodiment in which the flux enhanced part is provided in the pole tip of the main pole. When flux enhancing is provided in the pole tip, it can be expected as in embodiment 3, that the accuracy of the track width in the production process is enhanced, and magnetic domain control and a high Bs material such as 55% Fe-45% Ni having a saturation magnetic flux density of 1.6T or CoNiFe having a saturation magnetic flux density of 2.2T, or the like are used to improve the magnetic field intensity. The distance between the main pole and the soft magnetic underlayer is adjusted or the contact area of the pole tip with the main pole is adjusted so that the magnetic field intensity can be increased. The flux enhancing in the pole tip can also adjust the magnetic field intensity. As in FIGS. 18(1) and 18(2), when the pole tip has the flux enhanced part 26 and the flux enhanced end 39, all the ideas of FIG. 13 can be applied to the structure of the pole tip. The effect for suppressing the leakage magnetic flux from the front surface on the trailing side of the pole tip, the flux enhanced part and the flux enhanced end can be obtained when the main pole is arranged on the trailing side rather than the pole tip, as shown in FIG. 18(3).

Embodiment 5

Figure 19A:
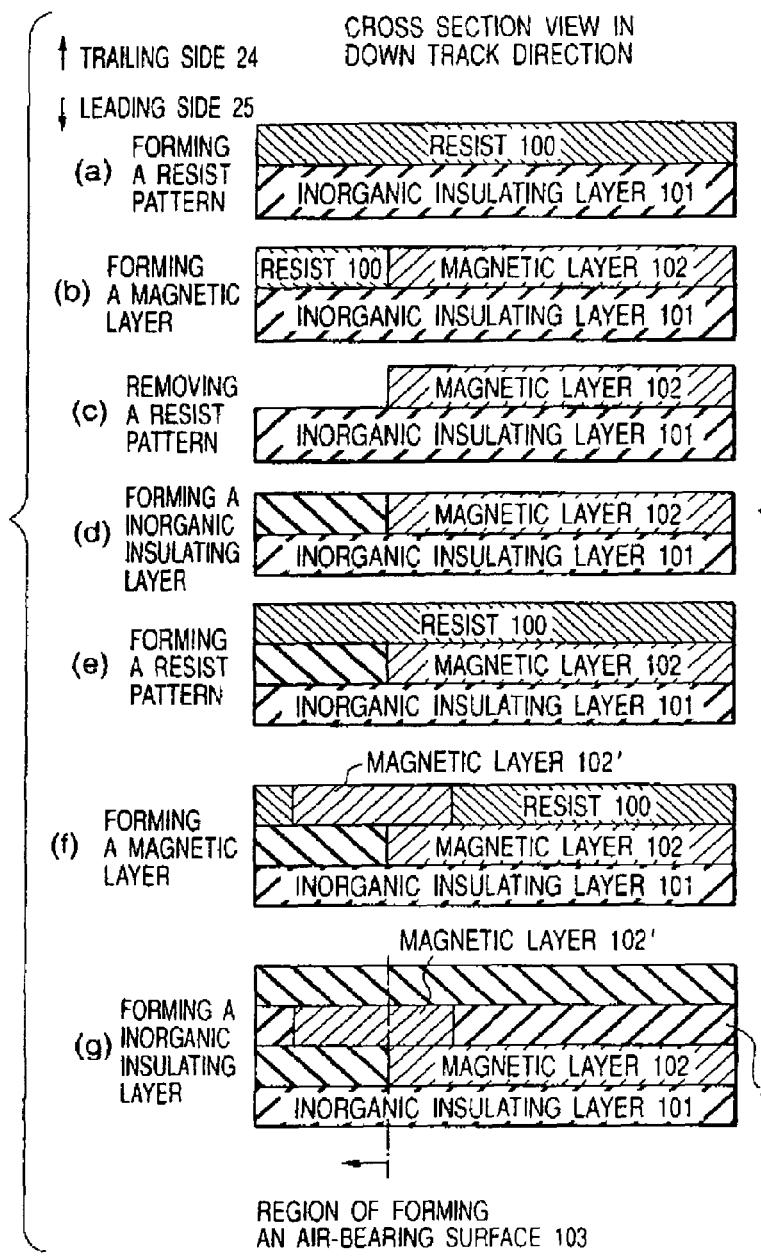
FIGS. 19(a) and 19(b) show schematic views of a main pole fabrication process according to an embodiment of the present invention (provided that the magnification is not uniform)
Figure 19B:
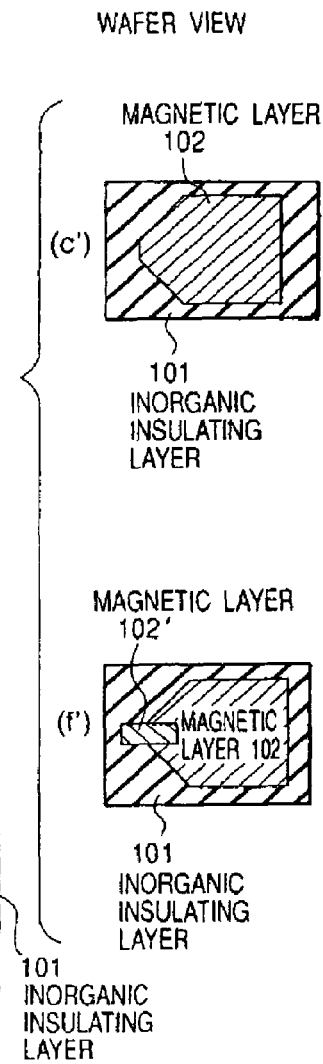

An embodiment of a method for producing a magnetic head according to the present invention will be described with the drawing. FIG. 19 shows schematic views of the production process of the present invention (provided that the magnification of the drawing is not uniform). FIG. 19(A) shows a cross section view in the down track direction and FIG. 19(B) shows a cross section view in the cross track direction. A inorganic insulating layer 101 is deposited by sputtering on a non-magnetic base 104 made of alumina titanium carbide. A magnetic layer 102 is deposited on the inorganic insulating layer by sputtering, and is patterned into a required shape to obtain a lower shield. A inorganic insulating layer 101 and a reading element are formed on the magnetic layer 102 as the lower shield. An upper shield and a magnetic layer 102 as the auxiliary pole are formed. The upper shield and the auxiliary pole may be separated into two layers by interposing the insulating film therebetween. FIG. 19(a) shows that a resist pattern is formed on the inorganic insulating layer. As the inorganic insulating layer, conventionally used $Al_2O_3$, SiC, AlN, $Ta_2O_5$, TiC, $TiO_2$ and $SiO_2$ can be used. FIG. 19(b) shows that the magnetic layer is plated. In the case of using electro-plating, 55% Fe-45% Ni having a saturation magnetic flux density of 1.6T or CoNiFe having a saturation magnetic flux density of 2.2T, or the like can be used. As the plating base layer, a magnetic layer of the same composition as the plating layer or a inmagnetic insulating layer may be used. FIG. 19(c) shows that the resist pattern is removed. FIG. 19(d) shows that a inorganic insulating layer is formed and the top surfaces of the inorganic insulating layer and the magnetic layer are flattened. In flattening, a polishing method such as chemical mechanical polishing (CMP) and ion-milling may be used. FIG. 19(e) shows that a resist pattern for forming a pole tip is formed. FIG. 19(f) shows that a magnetic layer 102' as the pole tip is formed. FIG. 19(f') is a cross section view in the cross track direction. The shape of the cross section view in the cross track direction of the magnetic layer 102' as the pole tip may be of the shape shown in FIG. 17. FIG. 19(g) shows that the resist pattern is removed to form a inorganic insulating layer. In the process for exposing the air bearing surface, the air bearing surface may be on the left side in the drawing from a position 103 indicated by a chain line. Using this fabrication method, a magnetic head for perpendicular recording of the present invention having the pole tip can be produced.

FIG. 20 shows schematic views of another fabrication process of the present invention (provided that the magnification of the drawing is not uniform). FIG. 20(A) shows a cross section view in the down track direction and FIG. 20(B) shows a cross section view in the cross track direction. The fabrication process before forming a coil is the same as FIG. 19. The production process before forming a coil is omitted in the drawing. FIG. 20(a) shows that a resist pattern is formed on the inorganic insulating layer. FIG. 20(b) shows that the magnetic layer is plated. FIG. 20(c) shows that the resist pattern is removed. FIG. 20(d) shows that a inorganic insulating layer is formed and the top surfaces of the inorganic insulating layer and the magnetic layer are flattened. In flattening, a polishing method such as chemical mechanical polishing (CMP) and ion-milling may be used. FIG. 20(e) shows that a resist pattern for forming a pole tip is formed. FIG. 20(f) shows that a magnetic layer 102' as the pole tip is formed. FIG. 20(f') is a cross section view in the down track direction. The shape of the wafer view of the magnetic layer 102' as the pole tip may be of the shape shown in FIG. 17. FIG. 20(g) shows that a resist pattern is formed. FIG. 20(h) shows that the magnetic layer 102' is etched with the resist pattern as a mask to form a slope. The slope may be formed with the flux enhanced part as shown in FIG. 18(1). Thereafter, the resist pattern is removed to form a inorganic insulating layer. In the process for exposing the air bearing surface, the air bearing surface may be on the left side in the drawing from the position 103 indicated by a chain line. Using this fabrication method, a magnetic head for perpendicular recording of the present invention having the pole tip can be produced.

Embodiment 6

Figure 21:
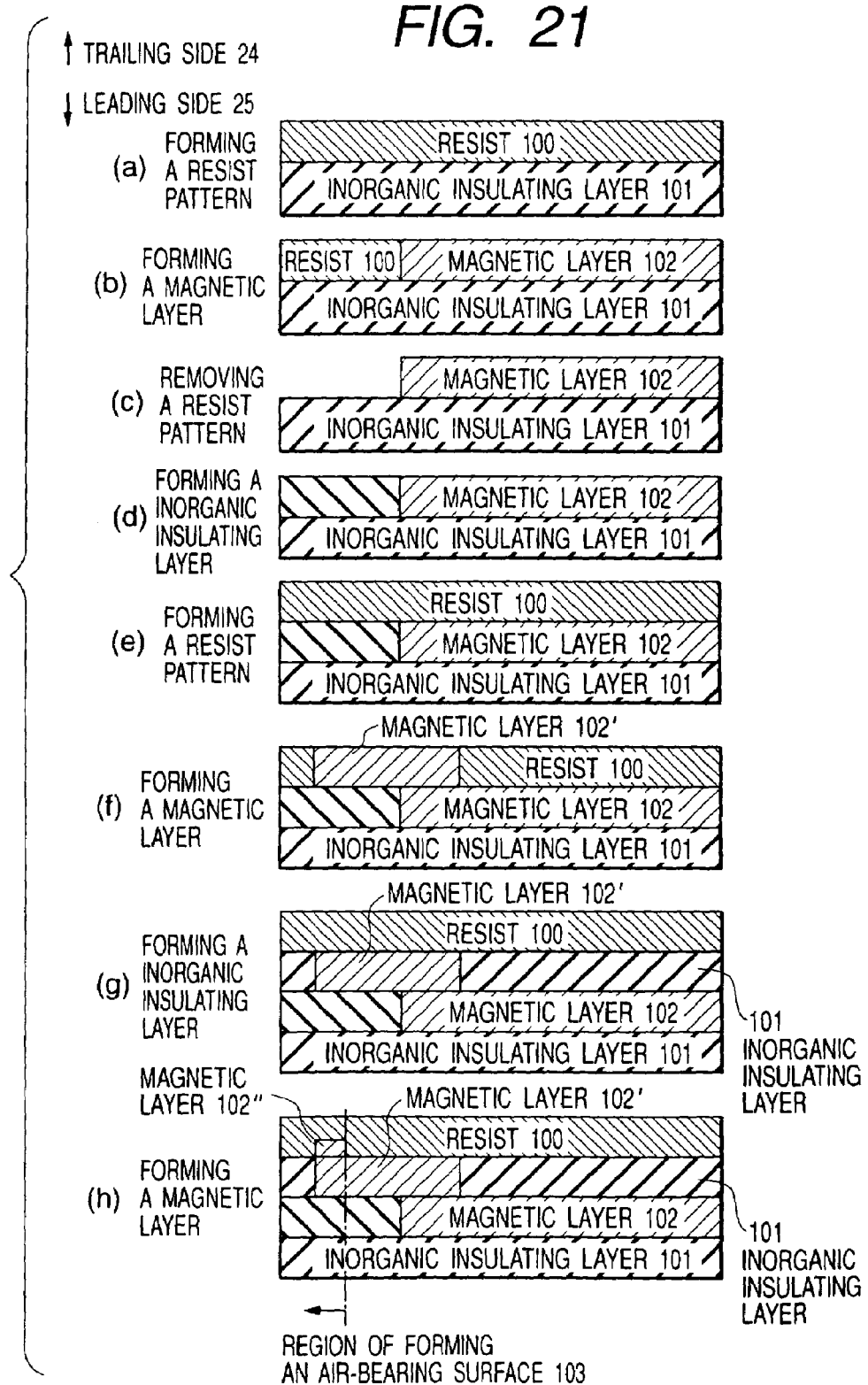
FIG. 21 shows schematic views of a main pole fabrication process according to an embodiment of the present invention (provided that the magnification is not uniform)

FIG. 21 shows schematic views of another fabrication process of the present invention (provided that the magnification of the drawing is not uniform). The drawing is a cross section view in the down track direction. The fabrication process before forming a coil is the same as FIG. 19. The fabrication process before forming a coil is omitted in the drawing. FIG. 21(a) shows that a resist pattern is formed on the inorganic insulating layer. FIG. 21(b) shows that the magnetic layer is plated. FIG. 21(c) shows that the resist pattern is removed. FIG. 21(d) shows that the inorganic insulating layer is formed and the top surfaces of the inorganic insulating layer and the magnetic layer are flattened. In flattening, a polishing method such as chemical mechanical polishing (CMP) and ion-milling may be used. FIG. 21(e) shows that a resist pattern for forming a pole tip is formed. FIG. 21(f) shows that a magnetic layer 102' as the pole tip is formed. The magnetic layer 102' as the pole tip may be formed with the flux enhanced part as shown in FIGS. 18(2) and 18(3). The shape of the cross section view in the cross track direction of the magnetic layer 102' as the pole tip may be of the shape shown in FIG. 17. FIG. 21(g) shows that a resist pattern is formed. FIG. 21(h) shows that a magnetic layer 102" is formed with the resist pattern as a mask. Thereafter, the resist pattern is removed to form a inorganic insulating layer. In the process for exposing the air bearing surface, the air bearing surface may be on the left side in the drawing from the position 103 indicated by a chain line. Using this fabrication method, a magnetic head for perpendicular recording of the present invention having the pole tip can be produced.

FIG. 22 shows schematic views of another fabrication process of the present invention (provided that the magnification of the drawing is not uniform). FIG. 22(A) shows a cross section view in the down track direction and FIG. 22(B) shows a diagram of the air bearing surface. The fabrication process before forming a coil is the same as FIG. 19. The fabrication process before forming a coil is omitted in the drawing. FIG. 22(a) shows that a magnetic layer is formed, a inorganic insulating layer is formed, and a resist pattern of the shape as shown in the drawing is formed on the inorganic insulating layer. This is the so-called lift-off method. FIG. 22(b) shows that the inorganic insulating layer is sputtered. FIG. 22(c) shows that after sputtering, the resist pattern and the non-organic layer attached thereto are removed. FIG. 22(d) shows that a resist pattern is formed. FIG. 22(e) shows that the magnetic layer is plated. The magnetic layer 102' as the pole tip may be formed with the flux enhanced part as shown in FIG. 17. The shape of the wafer view of the magnetic layer 102' as the pole tip may be of the shape shown in FIG. 17. FIG. 22(f) shows that the resist pattern is removed. Thereafter, a inorganic insulating layer is formed. In the process for exposing the air bearing surface, the air bearing surface may be on the left side in the drawing from the position 103 indicated by a chain line. Using this fabrication method, a magnetic head for perpendicular recording of the present invention having the pole tip can be produced.

FIG. 23 shows schematic views of another fabrication process of the present invention (provided that the magnification of the drawing is not uniform). FIG. 23(A) shows a cross section view in the down track direction and FIG. 23(B) shows a diagram of the air bearing surface. The fabrication process before forming a coil is the same as FIG. 19. The fabrication process before forming a coil is omitted in the drawing. FIG. 23(a) shows that a inorganic insulating layer is formed, and a resist pattern of the shape as shown in the drawing is formed on the inorganic insulating layer. This is the so-called lift-off method. FIG. 23(b) shows that the inorganic insulating layer is sputtered. FIG. 23(c) shows that after sputtering, the resist pattern and the inorganic insulating layer attached thereto are removed. FIG. 23(d) shows that a resist pattern is formed. FIG. 23(e) shows that the magnetic layer is plated. FIG. 23(f) shows that the resist pattern is removed. Thereafter, a inorganic insulating layer is formed. In the process for exposing the air bearing surface, the air bearing surface may be on the left side in the drawing from the position 103 indicated by a chain line. Using this fabrication method, a magnetic head for perpendicular recording of the present invention can be produced.

FIG. 24 shows schematic views of another fabrication process of the present invention (provided that the magnification of the drawing is not uniform). FIG. 24(A) shows a cross section view in the down track direction and FIG. 24(B) shows a diagram of the air bearing surface. The fabrication process before forming a coil is the same as FIG. 19. The fabrication process before forming a coil is omitted in the drawing. FIG. 24(a) shows that a inorganic insulating layer is formed, and a resist pattern is formed on the inorganic insulating layer. FIG. 24(b) shows that the inorganic insulating layer is etched with the resist pattern as a mask. In the case of using $Al_2O_3$, $BCl_3$ or a mixed gas for $BCl_3$ and $Cl_2$ may be used as an etching gas. In the case of using AlN, the chlorine gas may be used. In the case of using $Ta_2O_5$, TiC, $TiC_2$, $SiO_2$, and SiO which facilitate etching, fluorine gas, such as $CHF_3$, $CF_4$, $SF_6$, and $C_4F_8$, can be used. FIG. 24(c) shows that after etching, the resist pattern is removed. FIG. 24(d) shows that a resist pattern is formed. FIG. 24(e) shows that the magnetic layer is plated. FIG. 24(f) shows that the resist pattern is removed. Thereafter, a inorganic insulating layer is formed. In the process for exposing the air bearing surface, the air bearing surface may be on the left side in the drawing from the position 103 indicated by a chain line. Using this fabrication method, a magnetic head for perpendicular recording of the present invention can be produced.

The process for forming a magnetic layer in the above fabrication methods described using FIGS. 19 to 24 may be a process for using a magnetron sputtering method with a photoresist as a mask.

Embodiment 7

An invention described in this embodiment is a head assembly including a magnetic head slider equipped with a recording head with a main pole and an auxiliary pole and a read head with a reading element; gimbals for supporting the slider; and a suspension onto which the gimbals are fixed. The basic structure of the head assembly of this embodiment combines the suspension arm 12 shown in FIG. 2 with the magnetic head slider. Although not shown in the drawing, the gimbals are joined to the front end of the suspension arm 12. The gimbals and the suspension arm are different parts, but may be integrally formed at the front end of the suspension arm 12.

Embodiment 8

An invention described in this embodiment is a head assembly including a magnetic head slider equipped with a thin film magnetic head having a single-pole type perpendicular recording head and a read head with a reading element; gimbals for supporting the magnetic head slider; and a suspension arm onto which the gimbals are fixed, wherein the perpendicular recording head has a main pole and an auxiliary head, and in the main pole, part or all of a flux enhanced part in which the area of the cross section in parallel with an air bearing surface is decreased as it approaches the air bearing surface and a position of the flux enhanced part closest to the air bearing surface, that is, a flux enhanced end are arranged on the air in-flow side of the main pole rather than a vertical plane in parallel with the cross track direction including the edge on the air out-flow side of the air bearing surface of the main pole.

Embodiment 9

An invention described in this embodiment is a head assembly wherein in the main pole of the perpendicular recording head according to embodiment 8, part or all of the flux enhanced part or the flux enhanced end is arranged on the air in-flow side rather than a vertical plane in parallel with the cross track direction including the edge on the air in-flow side of the air bearing surface.

Embodiment 10

An invention described in this embodiment is a head assembly including a magnetic head slider equipped with a thin film magnetic head having a single-pole type perpendicular recording head and a read head with a reading element; gimbals for supporting the magnetic head slider;

and a suspension arm onto which the gimbals are fixed, wherein the perpendicular recording head has a main pole and an auxiliary pole, and in the main pole, part or all of the front surface on the air out-flow side of the main pole in the air bearing height direction viewed from the air bearing surface intersecting an air bearing surface is arranged on the air in-flow side rather than a vertical plane in parallel with the cross track direction including the edge on the air out-flow side of the air bearing surface.

Embodiment 11

An invention described in this embodiment is a head assembly including a magnetic head slider equipped with a thin film magnetic head having a single-pole type perpendicular recording head and a read head with a reading element; gimbals for supporting the magnetic head slider; and a suspension arm onto which the gimbals are fixed, wherein the perpendicular recording head has a main pole and an auxiliary pole, and in the main pole, part or all of the side surface intersecting the cross track direction of the main pole is arranged on the center side of the main pole rather than a vertical plane perpendicular to the cross track direction including the edge in the cross track direction of an air bearing surface.

Embodiment 12

An invention described in this embodiment is a head assembly including a magnetic head slider equipped with a thin film magnetic head having a single-pole type perpendicular recording head and a read head with a reading element; gimbals for supporting the magnetic head slider; and a suspension arm onto which the gimbals are fixed, wherein the perpendicular recording head has a main pole and an auxiliary pole, the main pole has a portion exposed to an air bearing surface to define a track width, that is, a pole tip, and in the main pole, part or all of a part in which the area of the cross section in parallel with the air bearing surface is decreased as it approaches the air bearing surface, that is, a flux enhanced part and a position of the flux enhanced part closest to the air bearing surface, that is, a flux enhanced end are arranged on the air in-flow side of the pole tip rather than a vertical plane in parallel with the cross track direction including the edge on the air out-flow side of the air bearing surface of the pole tip.

Embodiment 13

An invention described in this embodiment is a head assembly wherein in the perpendicular recording head according to embodiment 12, part or all of the flux enhanced part or the flux enhanced end of the main pole is arranged on the air in-flow side rather than a vertical plane including the edge on the air in-flow side of the air bearing surface of the pole tip.

Embodiment 14

An invention described in this embodiment is a head assembly including a magnetic head slider equipped with a thin film magnetic head having a single-pole type perpendicular recording head and a read head with a reading element; gimbals for supporting the magnetic head slider; and a suspension arm onto which the gimbals are fixed, wherein the perpendicular recording head has a main pole and an auxiliary pole, the main pole has a portion exposed to an air bearing surface to define a track width, that is, a pole tip, and in the pole tip, part or all of the front surface on the air out-flow side of the pole tip in the air bearing height direction viewed from the air bearing surface of the pole tip intersecting the air bearing surface is arranged on the air in-flow side rather than a vertical plane in parallel with the cross track direction including the edge on the air out-flow side of the air bearing surface.

Embodiment 15

An invention described in this embodiment is a head assembly including a magnetic head slider equipped with a thin film magnetic head having a single-pole type perpendicular recording head and a read head with a reading element; gimbals for supporting the magnetic head slider; and a suspension arm onto which the gimbals are fixed, wherein the perpendicular recording head has a main pole and an auxiliary pole, the main pole has a portion exposed to an air bearing surface to define a track width, that is, a pole tip, and in the pole tip, part or all of the side surface intersecting the cross track direction is arranged on the center side of the pole tip rather than a vertical plane perpendicular to the cross track direction including the edge in the cross track direction of the air bearing surface of the pole tip.

Embodiment 16

An invention described in this embodiment is a head assembly including a magnetic head slider equipped with a thin film magnetic head having a single-pole type perpendicular recording head and a read head with a reading element; gimbals for supporting the magnetic head slider; and a suspension arm onto which the gimbals are fixed, wherein the perpendicular recording head has a main pole and an auxiliary pole, the main pole has a portion exposed to an air bearing surface to define a track width, that is, a pole tip, and in the pole tip, part or all of a part in which the area of the cross section in parallel with the air bearing surface is decreased as it approaches the air bearing surface and magnetic flux is enhanced, that is, a flux enhanced part and a position of the flux enhanced part closest to the air bearing surface, that is, a flux enhanced end are arranged on the air in-flow side rather than a vertical plane in parallel with the cross track direction including the edge on the air out-flow side of the air bearing surface of the pole tip.

Embodiment 17

An invention described in this embodiment is a head assembly wherein in the main pole of the perpendicular recording head according to embodiment 16, wherein part or all of the flux enhanced part or the flux enhanced end is arranged on the air in-flow side rather than a vertical plane in parallel with the cross track direction including the edge on the air in-flow side of the air bearing surface.

In embodiments 7 to 17, it is possible to provide a head assembly equipped with the magnetic head according to embodiments 1 to 4 which can realize a recording magnetic field profile whose gradient is steep.

Embodiment 18

As shown in FIG. 3, the magnetic disk unit of this embodiment has a magnetic disk, a magnetic head slider equipped with recording and read heads, a spindle motor for rotatively driving the magnetic disk in one direction, a suspension and arm for supporting the slider, and a rotary actuator for driving the arm. The magnetic disk unit is structured to realize recording by a magnetic field profile whose gradient is steep and enhance a liner density in the disk rotating direction and a track density in the disk radius direction, thereby realizing a high areal recording density.

Embodiment 19

An invention described in this embodiment is a magnetic disk unit including a magnetic head slider equipped with a thin film magnetic head having a single-pole type perpendicular recording head and a read head with a reading element; a perpendicular magnetic recording medium having a soft magnetic underlayer; a spindle motor for rotating the perpendicular magnetic recording medium in a fixed direction; and a read channel IC circuit for processing magnetic information inputted and outputted through the recording head or the read head, wherein the perpendicular recording head has a main pole and an auxiliary pole, and in the main pole, part or all of a flux enhanced part in which the area of the cross section in parallel with an air bearing surface is decreased as it approaches the air bearing surface and a position the flux enhanced part closest to the air bearing surface, that is, a flux enhanced end are arranged on the leading side rather than a vertical plane in parallel with the cross track direction including the edge on the trailing side of the air bearing surface of the main pole.

Embodiment 20

An invention described in this embodiment is a magnetic disk unit according to embodiment 19, wherein part or all of the flux enhanced part or the flux enhanced end of the main pole is arranged on the leading side rather than a vertical plane in parallel with the cross track direction including the edge on the leading side of the air bearing surface.

Embodiment 21

An invention described in this embodiment is a magnetic disk unit including a magnetic head slider equipped with a thin film magnetic head having a single-pole type perpendicular recording head and a read head with a reading element; a perpendicular magnetic recording medium having a soft magnetic underlayer; a spindle motor for rotating the perpendicular magnetic recording medium in a fixed direction; and a read channel IC circuit for processing magnetic information inputted and outputted through the recording head or the read head, wherein the perpendicular recording head has a main pole and an auxiliary pole, and in the main pole, part or all of the front surface on the trailing side of the main pole in the air bearing height direction viewed from the air bearing surface intersecting an air bearing surface is arranged on the leading side rather than a vertical plane in parallel with the cross track direction including the edge on the trailing side of the air bearing surface.

Embodiment 22

An invention described in this embodiment is a magnetic disk unit including a magnetic head slider equipped with a thin film magnetic head having a single-pole type perpendicular recording head and a read head with a reading element; a perpendicular magnetic recording medium having a soft magnetic underlayer; a spindle motor for rotating the perpendicular magnetic recording medium in a fixed direction; and a read channel IC circuit for processing magnetic information inputted and outputted through the recording head or the read head, wherein the perpendicular recording head has a main pole and an auxiliary pole, and in the main pole, part or all of the side surface intersecting the cross track direction is arranged on the center side of the main pole rather than a vertical plane perpendicular to the cross track direction including the edge in the cross track direction of an air bearing surface.

Embodiment 23

An invention described in this embodiment is a magnetic disk unit including a magnetic head slider equipped with a thin film magnetic head having a single-pole type perpendicular recording head and a read head with a reading element; a perpendicular magnetic recording medium having a soft magnetic underlayer; a spindle motor for rotating the perpendicular magnetic recording medium in a fixed direction; and a read channel IC circuit for processing magnetic information inputted and outputted through the recording head or the read head, wherein the perpendicular recording head has a main pole and an auxiliary pole, the main pole has a portion exposed to an air bearing surface of the main pole opposite to the perpendicular magnetic recording medium to define a track width, that is, a pole tip, and in the main pole, part or all of a flux enhanced part in which the area of the cross section in parallel with the air bearing surface is decreased as it approaches the air bearing surface and a position of the flux enhanced part closest to the air bearing surface, that is, a flux enhanced end are arranged on the leading side rather than a vertical plane in parallel with the cross track direction including the edge on the trailing side on the air bearing surface of the pole tip.

Embodiment 24

An invention described in this embodiment is a magnetic disk unit wherein in the perpendicular recording head according to embodiment 23, part or all of the flux enhanced part or the flux enhanced end of the main pole is arranged on the leading side rather than a vertical plane including the edge on the leading side of the air bearing surface of the pole tip.

Embodiment 25

An invention described in this embodiment is a magnetic disk unit including a magnetic head slider equipped with a thin film magnetic head having a single-pole type perpendicular recording head and a read head with a reading element; a perpendicular magnetic recording medium having a soft magnetic underlayer; a spindle motor for rotating the perpendicular magnetic recording medium in a fixed direction; and a read channel IC circuit for processing magnetic information inputted and outputted through the recording head or the read head, wherein the perpendicular recording head has a main pole and an auxiliary pole, the main pole has a portion exposed to an air bearing surface of the main pole opposite to the perpendicular magnetic recording medium to define a track width, that is, a pole tip, and in the pole tip, part or all of the front surface on the trailing side of the pole tip in the air bearing height direction viewed from the air bearing surface of the pole tip intersecting an air bearing surface is arranged on the leading side rather than a vertical plane in parallel with the cross track direction including the edge on the trailing side on the air bearing surface of the pole tip.

Embodiment 26

An invention described in this embodiment is a magnetic disk unit including a magnetic head slider equipped with a thin film magnetic head having a single-pole type perpendicular recording head and a read head with a reading element; a perpendicular magnetic recording medium having a soft magnetic underlayer; a spindle motor for rotating the perpendicular magnetic recording medium in a fixed direction; and a read channel IC circuit for processing magnetic information inputted and outputted through the recording head or the read head, wherein the perpendicular recording head has a main pole and an auxiliary pole, the main pole has a portion exposed to an air bearing surface of the main pole opposite to the perpendicular magnetic recording medium to define a track width, that is, a pole tip, and in the pole tip, part or all of the side surface intersecting the cross track direction is arranged on the center side of the pole tip rather than a vertical plane perpendicular to the cross track direction including the edge of the cross track direction of the edge on the trailing side of the air bearing surface of the pole tip.

Embodiment 27

An invention described in this embodiment is a magnetic disk unit including a magnetic head slider equipped with a thin film magnetic head having a single-pole type perpendicular recording head and a read head with a reading element; a perpendicular magnetic recording medium having a soft magnetic underlayer; and a spindle motor for rotating the perpendicular magnetic recording medium in a fixed direction; and a read channel IC circuit for processing magnetic information inputted and outputted through the recording head or the read head, wherein the perpendicular recording head has a main pole and an auxiliary pole, the main pole has a portion exposed to an air bearing surface of the main pole opposite to the perpendicular magnetic recording medium to define a track width, that is, a pole tip, and in the pole tip, part or all of a flux enhanced part in which the area of the cross section in parallel with the air bearing surface is decreased as it approaches the air bearing surface and a position of the flux enhanced part closest to the air bearing surface are arranged on the leading side rather than a vertical plane in parallel with the cross track direction including the edge on the trailing side of the air bearing surface of the pole tip.

Embodiment 28

An invention described in this embodiment is a magnetic disk unit wherein in the main pole of the perpendicular recording head according to embodiment 27, wherein part or all of the flux enhanced part or the flux enhanced end is arranged on the leading side rather than a vertical plane in parallel with the cross track direction including the edge on the leading side of the air bearing surface of the pole tip.

The magnetic disk units of embodiments 19 to 28 are structured to realize recording by a magnetic field profile whose gradient is steep and enhance a liner density in the disk rotating direction and a track density in the disk radius direction, thereby realizing a high areal recording density.

Embodiment 29

An invention described in this embodiment is the magnetic head for perpendicular magnetic recording according to embodiments 1 to 6, a fabrication method thereof, and a magnetic disk unit equipped with a magnetic head slider, including the steps of:

forming a resist pattern on a non-organic layer;

forming a magnetic layer as a main pole on the inorganic insulating layer formed with the resist pattern;

removing the resist pattern;

flattening the top of the magnetic layer and the top of the inorganic insulating layer with the resist pattern removed;

forming a resist pattern; and sequentially forming a magnetic layer as the pole tip on the inorganic insulating layer and the magnetic layer formed with the resist pattern.

Embodiment 30

An invention described in this embodiment is the magnetic head for perpendicular magnetic recording according to embodiments 1 to 6, a fabrication method thereof, and a magnetic disk unit equipped with the same, the production method according to embodiment 29, including the steps of:

forming a resist pattern on a magnetic layer as the pole tip; and forming a slope on the pole tip with the resist pattern as a mask.

Embodiment 31

An invention described in this embodiment is the magnetic head for perpendicular magnetic recording according to embodiments 1 to 6, a fabrication method thereof, and a magnetic disk unit equipped with the same, including the steps of:

forming a resist pattern on a non-organic layer;

forming a magnetic layer as a main pole on the inorganic insulating layer formed with the resist pattern;

removing the resist pattern;

flattening the top of the magnetic layer and the top of the inorganic insulating layer with the resist pattern removed to form a resist pattern; and repeating twice or more a step of sequentially forming a magnetic layer on the magnetic layer formed with the resist pattern.

Embodiment 32

An invention described in this embodiment is the magnetic head for perpendicular magnetic recording according to embodiments 1 to 6, a fabrication method thereof, and a magnetic disk unit equipped with the same, including the steps of:

forming a resist pattern on a inorganic insulating layer;

forming a magnetic layer as a main pole on the inorganic insulating layer formed with the resist pattern;

removing the resist pattern;

flattening the top of the magnetic layer and the top of the inorganic insulating layer with the resist pattern removed to form a resist pattern on the magnetic layer or the magnetic layer and the non-organic layer;

sputtering the inorganic insulating layer and removing the resist pattern and the inorganic insulating layer attached thereto to form a slope;

forming a resist pattern; and forming a magnetic layer as the pole tip on the inorganic insulating layer and the magnetic layer formed with the resist pattern.

Embodiment 33

An invention described in this embodiment is the magnetic head for perpendicular magnetic recording according to embodiments 1 to 6, a fabrication method thereof, and a magnetic disk unit equipped with the same, which sequentially perform the steps of:

forming a resist pattern on a inorganic insulating layer, sputtering the inorganic insulating layer, and removing the resist pattern and the non-organic layer attached thereto to from a slope;

forming a resist pattern; and forming a inorganic insulating layer formed with the resist pattern and a magnetic layer as the main pole.

Embodiment 34

An invention described in this embodiment is the magnetic head for perpendicular magnetic recording according to embodiments 1 to 6, a fabrication method thereof, and a magnetic disk unit equipped with the same, which sequentially perform the steps of:

forming a resist pattern on a inorganic insulating layer;

forming a slope on the inorganic insulating layer with the resist pattern as a mask; and forming a resist pattern on the inorganic insulating layer to form a magnetic layer on the inorganic insulating layer formed with the resist pattern.

The magnetic disk units of embodiments 29 to 34 are structured to realize recording by a magnetic field profile whose gradient is steep and enhance a liner density in the disk rotating direction and a track density in the disk radius direction, thereby realizing a high surface recording density.

The present invention can reduce the influence of the leakage magnetic flux from the flux enhanced part and the flux enhanced end of a main pole and the front or side surface of the main pole, and can steepen the field gradient of a perpendicular magnetic field on the trailing side of the main pole and both edge sides of a track, so that a higher areal recording density can be realized.

What is claimed is:

1. A fabrication method of a magnetic head for perpendicular magnetic recording, which includes the steps of:

forming a first resist pattern on a first inorganic insulating layer;

removing the first resist pattern in a first area where a main pole is formed;

forming a first magnetic layer as the main pole on the first inorganic insulating layer in the first area where the first resist pattern was removed;

removing a remaining first resist pattern;

forming a second inorganic insulating layer in a second area where the remaining first resist pattern was removed;

flattening a top of the first magnetic layer and a top of the second inorganic insulating layer;

forming a second resist pattern;

removing the second resist pattern in a third area where a pole tip is formed; and sequentially forming a second magnetic layer as the pole tip on the second inorganic insulating layer and the first magnetic layer in the third area where the second resist pattern was removed.

2. The fabrication method of a magnetic head for perpendicular magnetic recording according to claim 1, which includes the steps of:

forming a third resist pattern on the second magnetic layer as said pole tip; and forming a slope on the pole tip with said third resist pattern as a mask.

* * * * *